(12) United States Patent
Sakurada et al.

(10) Patent No.: US 11,459,445 B2
(45) Date of Patent: Oct. 4, 2022

(54) COMPOSITION AND MOLDED BODY

(71) Applicant: SUMITOMO CHEMICAL COMPANY, LIMITED, Tokyo (JP)

(72) Inventors: Kenta Sakurada, Ichihara (JP); Eiji Nitta, Osaka (JP); Takaya Ichimiya, Ichihara (JP); Shota Konishi, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 156 days.

(21) Appl. No.: 16/963,580

(22) PCT Filed: Feb. 12, 2019

(86) PCT No.: PCT/JP2019/004785
§ 371 (c)(1),
(2) Date: Jul. 21, 2020

(87) PCT Pub. No.: WO2019/159864
PCT Pub. Date: Aug. 22, 2019

(65) Prior Publication Data
US 2021/0054169 A1 Feb. 25, 2021

(30) Foreign Application Priority Data

Feb. 13, 2018 (JP) .............................. JP2018-022838

(51) Int. Cl.
| C08K 5/07 | (2006.01) |
| C08K 5/05 | (2006.01) |
| C08L 33/16 | (2006.01) |
| C08K 5/053 | (2006.01) |
| C08K 5/09 | (2006.01) |
| C08K 5/1545 | (2006.01) |
| C08K 5/3417 | (2006.01) |
| C08K 5/3437 | (2006.01) |
| C08K 5/375 | (2006.01) |
| C08K 5/55 | (2006.01) |
| C08K 11/00 | (2006.01) |

(52) U.S. Cl.
CPC ............... *C08K 5/07* (2013.01); *C08K 5/05* (2013.01); *C08K 5/053* (2013.01); *C08K 5/09* (2013.01); *C08K 5/1545* (2013.01); *C08K 5/3417* (2013.01); *C08K 5/3437* (2013.01); *C08K 5/375* (2013.01); *C08K 5/55* (2013.01); *C08K 11/00* (2013.01); *C08L 33/16* (2013.01)

(58) Field of Classification Search
CPC ............... C08K 5/05; C08K 5/07; C08K 5/09
See application file for complete search history.

(56) References Cited

U.S. PATENT DOCUMENTS

| 8,197,924 B2* | 6/2012 | Mielewski .......... B29C 45/0046 428/68 |
| 8,653,154 B2* | 2/2014 | Morrison ............... G03G 9/097 522/74 |
| 9,439,972 B2* | 9/2016 | Rockhill ................. A61K 31/22 |
| 11,098,203 B2* | 8/2021 | Ozcelik ................... A61L 29/16 |
| 2004/0147654 A1 | 7/2004 | Kimura |
| 2010/0137249 A1 | 6/2010 | Wang |
| 2010/0291093 A1 | 11/2010 | Janda et al. |
| 2011/0281921 A1 | 11/2011 | Srebnik et al. |
| 2018/0230318 A1 | 8/2018 | Lynn et al. |

FOREIGN PATENT DOCUMENTS

| JP | 2002-20632 A | 1/2002 |
| JP | 5881287 B2 | 3/2016 |
| JP | 2016-185935 A | 10/2016 |
| JP | 6016342 B2 | 10/2016 |
| JP | 2016-214126 A | 12/2016 |

OTHER PUBLICATIONS

Cunico, et al., The Journal of Supercritical Fluids 130 (2017) 381-388. (Year: 2017).*
JP-2016-185935-A publication, dated Oct. 27, 2016, with an English machine translation.
JP-2016-214126-A publication, dated Dec. 22, 2016, with an English translation.
International Search Report (PCT/ISA/210) issued in PCT/JP2019/004785, dated May 21, 2019.

\* cited by examiner

*Primary Examiner* — Vickey Nerangis
(74) *Attorney, Agent, or Firm* — Birch, Stewart, Kolasch & Birch, LLP

(57) ABSTRACT

The present invention provides a composition capable of reducing adhesion of biofilms and therefore useful for producing a molded body. The composition comprises at least one resin (A) selected from the group consisting of thermoplastic resins and thermosetting resins, and a quorum sensing inhibitor (B), and is configured such that a common logarithm log S of solubility of the quorum sensing inhibitor (B) in water of 25° C. is less than 0.1, and $Ra_1$ is greater than 3.2 $MPa^{1/2}$, provided that $Ra_1$ is a distance between a Hansen solubility parameter of the at least one resin (A) selected from the group consisting of thermoplastic resins and thermosetting resins and a Hansen solubility parameter of the quorum sensing inhibitor (B).

5 Claims, No Drawings

COMPOSITION AND MOLDED BODY

TECHNICAL FIELD

The present invention relates to a composition and a molded body.

BACKGROUND ART

Conventionally, resin molded bodies have been employed for home appliance members and the like. In order to prevent growth of microorganisms such as fungi, bacteria, and archaea on surfaces of the resin molded bodies, the resin molded bodies are mixed with an antimicrobial agent. For example, Patent Document 1 discloses a resin molded body including a silver-based antimicrobial agent.

PRIOR ART DOCUMENTS

Patent Document

Patent Document 1: JP-A-2002-20632

SUMMARY OF THE INVENTION

Problems to be Solved by the Invention

However, such a resin molded body including a silver-based antimicrobial agent is not capable of preventing, in environments in which water and an organic material are present, adhesion of polymers such as oligosaccharides, proteins, and nucleic acids formed by such microorganisms (hereinafter, which may be referred to as a Biofilm). In view of this, an object of the present invention is to provide a composition capable of reducing such adhesion of biofilms and therefore useful for producing a molded body, and a molded body including the composition.

Means for Solving the Problems

The present invention provides the following [1] to [6].

[1] A composition including: at least one resin (A) selected from the group consisting of thermoplastic resins and thermosetting resins; and a quorum sensing inhibitor (B),
in which a common logarithm log S of solubility of the quorum sensing inhibitor (B) in water of 25° C. is less than 0.1, and
$Ra_1$ is greater than 3.2 $MPa^{1/2}$, provided that $Ra_1$ is a distance between a Hansen solubility parameter of the at least one resin (A) selected from the group consisting of thermoplastic resins and thermosetting resins and a Hansen solubility parameter of the quorum sensing inhibitor (B).

[2] The composition according to [1], in which the at least one resin (A) is a thermoplastic resin or thermoplastic resins.

[3] The composition according to [1] or [2], further including an antimicrobial/antifungal agent (C).

[4] The composition according to any one of [1] to [3], further including a surface modifier (D).

[5] A molded body including the composition according to any one of [1] to [4].

[6] The molded body according to [5], in which a dispersion force component $\gamma^d$ of a surface free energy is 25 mN/m or less, or a sum of a dipole force component $\gamma^p$ and a hydrogen bonding component $\gamma^h$ of the surface free energy ($\gamma^p+\gamma^h$) is 30 mN/m or more.

Effect of the Invention

According to the present invention, it is possible to provide a composition capable of reducing such adhesion of biofilms and therefore useful for producing a molded body, and a molded body including the composition.

MODE FOR CARRYING OUT THE INVENTION

A composition according to the present invention includes at least one resin (A) selected from the group consisting of thermoplastic resins and thermosetting resins, and a quorum sensing inhibitor (B),
a common logarithm log S of solubility of the quorum sensing inhibitor (B) in water of 25° C. is less than 0.1, and
$Ra_1$ is greater than 3.2 $MPa^{1/2}$, provided that $Ra_1$ is a distance between a Hansen solubility parameter of the at least one resin (A) (hereinafter, may be referred to as $HSP_A$) selected from the group consisting of thermoplastic resins and thermosetting resins and a Hansen solubility parameter of the quorum sensing inhibitor (B) (hereinafter, may be referred to as $HSP_B$).

[At Least One Resin (A) Selected from the Group Consisting of Thermoplastic Resins and Thermosetting Resins]

Examples of at least one resin (A) selected from the group consisting of thermoplastic resins and thermosetting resins include:

polyolefins such as polypropylene and polyethylene;

acrylic and methacrylic resins such as methyl (meth)acrylate polymer, ethyl (meth)acrylate polymer, octadecyl (meth)acrylate polymer, hexadecyl(meth)acrylate polymer, tetradecyl(meth)acrylate polymer, poly(methyl methacrylate), cross-linked poly(methyl methacrylate), and poly(methyl acrylate);

styrene resins such as polystyrene, acrylonitrile-butadiene-styrene resin, acrylonitrile-acrylic rubber-styrene resin, acrylonitrile-ethylene rubber-styrene resin, (meth)acrylate ester-styrene resin, styrene-butadiene-styrene resin, and styrene-butadiene copolymer;

polyimides such as nylon;

polycarbonates;

polyesters such as saturated polyesters, and unsaturated polyesters;

polyphenylene oxides;

polyacetals;

chlorine-containing resins such as polyvinylchloride and polyvinylidene chloride;

vinyl acetate resins such as polyvinyl acetate, and ethylene-vinyl acetate resin;

ethylene-(meth)acrylate ester copolymers such as methyl ethylene-(meth)acrylate copolymer, ethyl ethylene-(meth)acrylate copolymer, ethylene-octadecyl(meth)acrylate copolymer, ethylene-hexadecyl(meth)acrylate copolymer, ethylene-tetradecyl(meth)acrylate copolymer, and ethylene-octadecyl(meth)acrylate-methyl(meth)acrylate copolymer, and ionomer resins thereof;

ethylene-(meth)acrylate resins and ionomer resins thereof;

vinyl alcohol resins such as polyvinyl alcohol, ethylene-vinyl alcohol resin;

cellulosic resins;

thermoplastic elastomers such as vinyl chloride-based elastomers, urethane-based elastomers, polyolefin-based elastomers, and polyester-based elastomers;

engineering plastics such as polyphenylene sulfide, polyamide imide, polyether ether ketone, polyphenylene ether, and modified polyphenylene ether;

fluoroalkyl group-containing polymers such as 1H,1H, 2H,2H-tridecafluoro-1-octyl(meth)acrylate polymer, and 1H,1H,2H,2H-heptafluoro-1-hexyl(meth)acrylate polymer polyether-polypropylene block copolymers;
polyether ester amide;
phenol resins;
xylene resins;
petroleum resins;
polyurethane;
urea resins;
melamine resins;
alkyd resins;
epoxy resins;
silicone resins;
furan resins; and
polyimide.

Among these, preferable examples are polyolefins, acrylic and methacrylic resins, styrene resins, polyesters, chlorine-containing resins, vinyl acetate resins, ethylene-(meth)acrylate ester copolymer and ionomers thereof, vinyl alcohol resins, thermoplastic elastomers, engineering plastics, phenol resins, polyurethane, urea reins, melamine resins, epoxy resins, and silicone resins. More preferable examples are polyolefins, acrylic and methacrylic resins, styrene resins, polyesters, thermoplastic elastomers, engineering plastics, and polyurethane. Further preferable examples are polypropylene, cross-linked poly(methyl methacrylate), acrylonitrile-butadiene-styrene resin, unsaturated polyester, polyolefin-based elastomer, modified phenylene ether, and polyurethane.

Examples of the at least one resin (A) selected from the group consisting of the thermoplastic resins and the thermosetting resins include a polymer (A1) and a polymer (A2) below.

Polymer (A1):

The polymer includes a structural unit (A) derived from at least one kind selected from the group consisting of ethylene and propylene, and a structural unit (B) represented by the following formula (1), and optionally includes at least one structural unit (C) selected from the group consisting of a structural unit represented by the following formula (2) and a structural unit represented by the following formula (3), a proportion of the number of the structural unit (A) is 70% or more and 99% or less and a proportion of the number of the structural unit (B) and the structural unit (C) in total is 1% or more and 30% or less, with respect to 100% of the total number of the structural unit (A), the structural unit (B) and the structural unit (C), and a proportion of the number of the structural unit (B) is 1% or more and 100% or less and a proportion of the number of the structural unit (C) is 0% or more and 99% or less, with respect to 100% of the total number of the structural unit (B) and the structural unit (C).

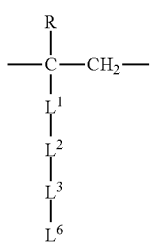

Formula (1)

(where
R is a hydrogen atom or a methyl group,
$L^1$ is —CO—O—, —O—CO—, or —O—,
$L^2$ is a single bond, —$CH_2$—, —$CH_2$—$CH_2$—, —$CH_2$—$CH_2$—$CH_2$—, —$CH_2$—CH(OH)—$CH_2$—, or —$CH_2$—CH($CH_2$OH)—,
$L^3$ is a single bond, —CO—O—, —O—CO—, —O—, —CO—NH—, —NH—CO—, —CO—NH—CO—, —NH—CO—NH—, —NH—, or —N($CH_3$)—,
$L^6$ is —$(CH_2)_n$—$(R^2O)_p$—$R^1$,
$R^1$ is a $C_1$ to $C_{30}$ alkyl group, or a $C_1$ to $C_{15}$ alkyl group in which one or more hydrogen atoms are substituted with one or more fluorine atoms,
$R^2$ is a $C_1$ to $C_{15}$ alkylene group, or a $C_1$ to $C_{15}$ alkylene group in which one or more hydrogen atoms are substituted with one or more fluorine atoms,
n is an integer not less than 0 but not more than 10, and p is an integer not less than 0 but not more than 15,
if p is an integer equal to or more than 2, the plurality of —($R^2$O)— may be identical with each other or different from each other.

Each of the chemical formulae listed in $L^1$, $L^2$, and $L^3$ is such that the left side of the chemical formula corresponds to the upper side of Formula (1) and the right side of the chemical formula corresponds to the lower side of Formula (1)).

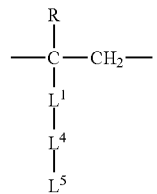

Formula (2)

(where
R is a hydrogen atom or a methyl group,
$L^1$ is —CO—O—, —O—CO—, or —O—,
$L^4$ is a single bond or a $C_1$ to $C_8$ alkylene group,
$L^5$ is a hydrogen atom, an epoxy group, —CH(OH)—$CH_2$OH, a carboxy group, a hydroxy group, an amino group, or a $C_1$ to $C_4$ alkyl amino group,
each of the chemical formulae listed in $L^1$ is such that the left side of the chemical formula corresponds to the upper side of Formula (2) and the right side of the chemical formula corresponds to the lower side of Formula (2)).

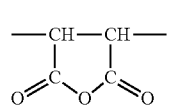

Formula (3)

Polymer (A2):

The polymer includes a structural unit (A) derived from ethylene, and a structural unit (B) represented by the formula (1) above, and includes at least one structural unit (C) selected from the group consisting of a structural unit represented by the formula (2) above and a structural unit represented by the formula (3) above, a proportion of the number of the structural unit (A) is 70% or more and 99% or less and a proportion of the number of the structural unit (B) and the structural unit (C) in total is 1% or more and 30% or less, with respect to 100% of the total number of the structural unit (A), the structural unit (B) and the structural unit (C), and a proportion of the number of the structural unit (B) is 1% or more and 99% or less and a proportion of the number of the structural unit (C) is 1% or more and 99% or less, with respect to 100% of the total number of the structural unit (B) and the structural unit (C).

Each of the polymer (A1) and the polymer (A2) may be that a content of the structural unit (B) is 30 wt % or more where the total amount of the structural unit (A), the structural unit (B), and the structural unit (C) is 100 wt %.

Each of the polymer (A1) and the polymer (A2) may be that $R^1$ constituting $L^6$ in structural unit (B) represented by Formula (1) is $CF_3(CF_2)_a-$, where a is an integer not less than 3 but not more than 9).

Each of the polymer (A1) and the polymer (A2) may be cross-linked.

Each of the polymer (A1) and the polymer (A2) may have a gel fraction of 20% or more.

Each of the polymer (A1) and the polymer (A2) preferably are that the total number of the structural unit (A), the structural unit (B), and the structural unit (C) is 90% or more, where the total number of all structural units contained in the polymer is 100%.

Each of the polymer (A1) and the polymer (A2) may be preferably configured as below.

A Structural Unit (B) Represented by Formula (1)

R is preferably a hydrogen atom.

$L^1$ is preferably —CO—O— or —O—CO—, and more preferably —CO—O—.

$L^2$ is preferably a single bond, —$CH_2$—, —$CH_2$—$CH_2$—, or —$CH_2$—$CH_2$—$CH_2$—, or more preferably a single bond.

$L^3$ is preferably a single bond, —O—CO—, —O—, —NH—, or —N($CH_3$)—, or more preferably a single bond.

The $C_1$ to $C_{30}$ alkyl group represented by $R^1$ may be a linear alkyl group or a branched alkyl group.

Examples of $R^1$ that represents a $C_1$ to $C_{15}$ alkyl group in which one or more hydrogen atoms are substituted with one or more fluorine atoms include $CF_3(CF_2)_a-$ (where a is an integer not less than 0 but not more than 14), $CF_2H(CHF)_b(CF_2)_c-$ (where b and c are independently an integer equal to or more than 0, and a sum of b and c is an integer not less than 0 but not more than 14).

$R^1$ is preferably $CF_3(CF_2)_a-$ (where a is an integer not less than 0 but not more than 14), more preferably $CF_3(CF_2)_a-$ (where a is an integer not less than 3 but not more than 9), or further preferably $CF_3(CF_2)_a-$ (where a is an integer not less than 5 but not more than 7).

In case where p is not less than 1 but not more than 15, examples of —$(R^2O)_p$—$R^1$ include —$(C_3F_6O)_f(C_2F_4O)_e(CF_2O)_dCF_3$ (where d, e, and f are independently an integer equal to or more than 0, and a sum of d, e, and f is an integer not less than 1 but not more than 15), and —$(C_3H_3F_3O)_i(C_2H_2F_2O)_h(CHFO)_gCHF_2$ (where g, h, and i are independently an integer equal to or more than 0, and a sum of g, h, and i is an integer not less than 1 but not more than 15).

In case where p is not less than 1 but not more than 15, —$(R^2O)_p$—$R^1$— is preferably —$(C_3F_6O)_f(C_2F_4O)_e(CF_2O)_dCF_3$ (where d, e, and f are independently an integer equal to or more than 0, and a sum of d, e, and f is an integer not less than 1 but not more than 15), and more preferably, —$(C_2F_4O)_e(CF_2O)_dCF_3$ (where d and e are independently an integer equal to or more than 0, and a sum of d and e is an integer not less than 1 but not more than 15).

n constituting $L^6$ is preferably an integer not less than 0 but not more than 4, more preferably 1 or 2, or further preferably 2.

The structural unit (B) represented by Formula (1) is preferably a structural unit represented by any one of the followings.

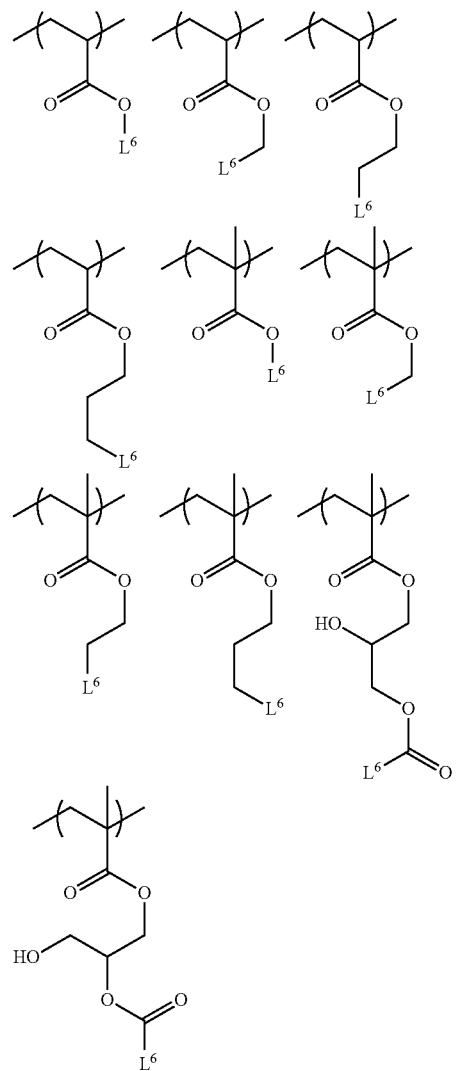

(where $L^6$ is as defined above.)

The polymer (A1) and the polymer (A2) may include two or more kinds of structural units (B).

Structural Unit Represented by Formula (2)

R is preferably a hydrogen atom.

$L^1$ is preferably —CO—O—, —O—CO— or —O—, more preferably —CO—O— or —O—CO—, and further preferably —CO—O—.

Examples of the $C_1$ to $C_8$ alkylene group represented by $L^4$ include a methylene group, an ethylene group, an n-propylene group, a 1-methylethylene group, an n-butylene group, a 1,2-dimethylethylene group, a 1,1-dimethylethylene group, a 2,2-dimethylethylene group, an n-pentylene group, an n-hexylene group, an n-heptalene group, an n-octylene group, and a 2-ethyl-n-hexylene group.

$L^4$ is preferably a single bond, a methylene group, an ethylene group, or an n-propylene group, and more preferably a methylene group.

Examples of the $C_1$ to $C_4$ alkylamino group represented by $L^5$ include a methylamino group, an ethylamino group, a propylamino group, a butylamino group, a dimethylamino group, and a diethylamino group.

$L^5$ is preferably a hydrogen atom, an epoxy group, or —CH(OH)—CH$_2$OH, and more preferably a hydrogen atom.

The structural unit represented by Formula (2) is preferably a structural unit represented by any one of the followings.

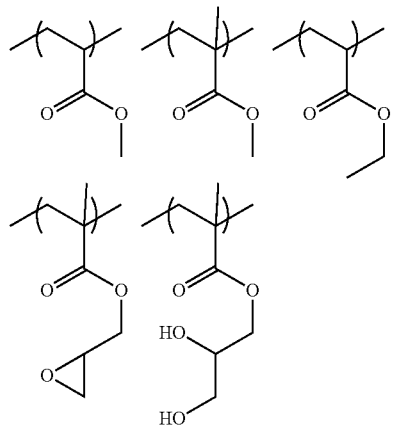

The polymer (A1) and the polymer (A2) may include two or more kinds of structural units (C).

The polymer (A1) may be a polymer
including:
a structural unit (A),
a structural unit (B) represented by Formula (1), where R is a hydrogen atom or a methyl group, $L^1$ is —CO—O—, $L^2$ and $L^3$ are a single bond, and $L^6$ is —(CH$_2$)$_n$—R$^1$, and
a structural unit (C) represented by Formula (2), where R is a hydrogen atom or a methyl group, $L^1$ is —CO—O—, $L^4$ is a $C_1$ alkylene group, and $L^5$ is a hydrogen atom,
in which a total number of the structural unit (A), the structural unit (B), and the structural unit (C) is 90% or more, where a total number of the whole structural units included in the polymer is 100%.

The polymer (A2) may be a polymer
including:
a structural unit (A);
a structural unit (B) represented by Formula (1), where R is a hydrogen atom or a methyl group, $L^1$ is —CO—O—, $L^2$ and $L^3$ are a single bond, and $L^6$ is —(CH$_2$)$_n$—R$^1$, and
a structural unit (C) represented by Formula (2), where R is a hydrogen atom or a methyl group, $L^1$ is —CO—O—, $L^4$ is a $C_1$ alkylene group, and $L^5$ is a hydrogen atom,
in which a total number of the structural unit (A), the structural unit (B), and the structural unit (C) is 90% or more, where a total number of the whole structural units included in the polymer is 100%.

The number of the structural unit (A) in the polymer (A1) and the polymer (A2) is not less than 70% but not more than 99%, where the total number of the structural unit (A), the structural unit (B), and the structural unit (C) is 100%, and the number of the structural unit (A) in the polymer (A1) and the polymer (A2) is preferably not less than 75% but not more than 99%, or more preferably not less than 80% but not more than 99%, for the sake of better moldability for the molded body including the polymer (A1) or the polymer (A2), and the quorum sensing inhibitor (B).

The total number of the structural unit (B) and the structural unit (C) in the polymer (A1) and the polymer (A2) is not less than 1% but not more than 30%, where the total number of the structural unit (A), the structural unit (B), and the structural unit (C) is 100%, and the total number of the structural unit (B) and the structural unit (C) in the polymer (A1) and the polymer (A2) is preferably not less than 5% but not more than 30%, or more preferably not less than 10% but not more than 30%, for the sake of better water-repellent property and oil-repellent property for the molded body including the polymer (A1) or the polymer (A2), and the quorum sensing inhibitor (B).

The number of the structural unit (B) in the polymer (A1) and the polymer (A2) is not less than 1% but not more than 99%, where the total number of the structural unit (B) and the structural unit (C) is 100%, and the number of the structural unit (B) in the polymer (A1) and the polymer (A2) is preferably not less than 10% but not more than 99%, more preferably not less than 20% but not more than 99%, or further preferably not less than 50% but not more than 99% for the sake of better water-repellent property and oil-repellent property for the molded body including the polymer (A1) or the polymer (A2), and the quorum sensing inhibitor (B).

The number of the structural unit (C) in the polymer (A1) and the polymer (A2) is not less than 1% but not more than 99%, where the total number of the structural unit (B) and the structural unit (C) is 100%, and the number of the structural unit (C) in the polymer (A1) and the polymer (A2) is preferably not less than 5% but not more than 99%, more preferably not less than 10% but not more than 99%, or further preferably not less than 20% but not more than 99% for the sake of better moldability for the molded body including the polymer (A1) or the polymer (A2), and the quorum sensing inhibitor (B).

One aspect of the at least one resin (A) selected from the thermoplastic resins and the thermosetting resins may be a mixture including:
the polymer (A1);
a polymer (A20) whose melting peak temperature or glass transition temperature observed by differential scanning calorimetry is not lower than 50° C. but not higher than 180° C., but the polymer (A1) is excluded from the polymer (A20),
in which a content of the polymer (A1) is not less than 1 wt % but not more than 99 wt % and a content of the polymer (A20) is not less than 1 wt % but not more than 99 wt % where a total amount of the polymer (A1) and the polymer (A20) is 100 wt %.

Further, one aspect of the at least one resin (A) selected from the thermoplastic resins and the thermosetting resins may be a mixture including:
the polymer (A2);
a polymer (A21) whose melting peak temperature or glass transition temperature observed by differential scanning calorimetry is not lower than 50° C. but not higher than 180° C., but the polymer (A2) is excluded from the polymer (A21),
in which a content of the polymer (A2) is not less than 1 wt % but not more than 99 wt % and a content of the polymer (A21) is not less than 1 wt % but not more than 99 wt % where a total amount of the polymer (A2) and the polymer (A21) is 100 wt %.

A melting peak temperature or glass transition temperature of the polymer (A20) and the polymer (A21) observed by differential scanning calorimetry (DSC) is not less than 50° C. but not more than 180° C.

The melting peak temperature of the polymer (A20) and the polymer (A21) is a temperature at an extremum of a melting peak obtained by analyzing, according to a method based on JIS K7121-1987, a melting curve measured by differential scanning calorimetry measurement as below, and is a temperature at which melting heat absorption amount is maximum.

The glass transition temperature of the polymer (A20) and the polymer (A21) is an intermediate glass transition temperature determined through analysis of a melting curve acquired in differential scanning calorimetry described later by using a method in accordance with JIS K7121-1987.

[Differential Scanning calorimetry]

Using a differential scanning calorimeter under nitrogen atmosphere, an aluminum pan encapsulating approximately 5 mg of a sample therein is Step (1) retained at 200° C. for 5 minutes, and then Step (2) cooled from 200° C. to −80° C. at a rate of 5° C./min, and then Step (3) retained at −80° C. for 5 minutes, and then Step (4) warmed from −80° C. to 200° C. at a rate of 5° C./min. A differential scanning calorimetry curve acquired in the calorimetry of the process Step (4) is defined as a melting curve.

Examples of the polymer (A20) and the polymer (A21) having a melting peak temperature in the range of 50° C. or higher and 180° C. or lower include high-density polyethylene (HDPE), high-pressure low-density polyethylene (LDPE), ethylene-α-olefin copolymer, ethylene-vinyl acetate copolymer (EVA), and polypropylene (PP).

Examples of the polymer (A20) and the polymer (A21) having a glass transition temperature in the range of 50° C. or higher and 180° C. or lower include cyclic olefin polymer (COP), cyclic olefin copolymer (COC), polystyrene (PS), polyvinyl chloride (PVC), acrylonitrile-styrene copolymer (AS), acrylonitrile-butadiene-styrene copolymer (ABS), polymethyl methacrylate (PMMA), polyvinyl alcohol (PVA), polyethylene terephthalate (PET), polyacrylonitrile (PAN), polyamide 6 (PA6), polyamide 66 (PA66), polycarbonate (PC), polyphenylene sulfide (PPS), and polyether ether ketone (PEEK).

The composition according to the present invention may include only one kind of the at least one resin (A) selected from the thermoplastic resins and the thermosetting resins or may include two or more kinds of the at least one resin (A).

[Quorum Sensing Inhibitor (B)]

A quorum sensing inhibitor is a compound for inhibiting quorum sensing of microorganisms.

Quorum sensing inhibition can be measured by a bioassay using a pigment-producing microorganism, a bioluminescent microorganism, or the like, depending on a quorum-sensing inducing material (see Sensors 2013, 13, 5117-5129, for example).

Sensors 2013, 13, 5117-5129 discloses a technique in which, to a reporter strain such as *C. violaceum* CV026 in a medium, N-hexanoyl homoserine lactone, which induces quorum sensing therein, was added and then caffeine serving as a quorum sensing inhibitor was added, and the medium was incubated at a controlled temperature. Because the amount of a violet pigment (violacein) thus produced was smaller than the amount of the violet pigment (violacein) in the case where caffeine was not added, this literature concludes that caffeine has a quorum sensing inhibiting function.

The quorum sensing inhibitor may be preferably a quorum sensing inhibitor as described below.

A quorum sensing inhibitor by which the amount of the violet pigment (violacein) is 85% or less, where the amount of the violet pigment (violacein) is produced as a result of such incubation that, based on the method described in Sensors 2013, 13, 5117-5129, to *C. violaceum* CV026 (reporter strain) in a medium, N-hexanoyl homoserine lactone is added and then a quorum sensing inhibitor is added, and the medium was incubated at a controlled temperature, and the amount of the violet pigment (violacein) produced in incubation at the controlled temperature without the quorum sensing inhibitor added is 100%.

Examples of the quorum sensing inhibitor include:

phenylpropanoids such as eugenol, methyl eugenol, cinnamaldehyde, cinnamic acid, vanillin, isovanillin, ferulic acid, chlorogenic acid, caffeic acid, p-coumaric acid, cinnamaldehyde, methyl cinnamate, phenyl propionate, 2-methoxycinnamate, 3-methoxycinnamate, 4-methoxycinnamate, 3-bromocinnamate, 2-fluorocinnamate, 3-fluorocinnamate, 3-methylcinnamate, 4-acetoxycinnamate, 4-bromocinnamate, 4-ethoxycinnamate, 4-fluorocinnamate, 3,4-dimethoxycinnamate, 2,3-dimethoxycinnamate, 2,5-dimethoxycinnamate, 2,3,4-trimethoxycinnamate, 3,4,5-trimethoxycinnamate, and lignin;

benzoic acid analogs such as salicylic acid, vanillic acid, gallic acid, and ellagic acid;

tannins such as 1,2,3,4,6-pentagalloyl glucose, punicalagin, hamamelitannin, and tannic acid;

stilbene analogs and polyketides thereof such as resveratrol and pterostilbene;

flavonoids such as (−)-catechin, (−)-epicatechin, (−)-gallocatechin, (−)-epigallocatechin, (−)-catechin gallate, (−)-epicatechin gallate, (−)-gallocatechin gallate, (−)-epigallocatechin gallate, (−)-naringenin, flavone, apigenin, chrysin, acacetin, flavonol, kaempferol, quercetin, quercitrin, flavanone, isosakuranetin, pinostrobin, eriodictyol, cyanidin, and malvidin;

diarylheptanoids such as curcumin;

terpenes and terpenoids such as carvacrol, salvipisone, akantospermorid, isolimoninic acid, ichangin, betulic acid, ursolic acid, gymnemic acid, protoanemonin, obacunone, deacetyl nomilinic acid glucoside, and phytol;

sulfur-containing compounds such as allicin, ajoene, sulforaphane, allyl isothiocyanate, iberin, thiazolidinedione, and diphenyl disulfide;

nitrogen-containing compounds such as indole and 2-methyltryptoline;

coumarin derivatives such as umbelliferone and scopoletin;

furanocoumarins such as psoralen, angelicin, bergamotine, and dihydroxy bergamotine;

quinone derivatives such as chrysophanol, emodin, shikonin, purpurin, and embelin;

alkaloids such as berberine, berberine chloride hydrate, chelerythrine, sanguinarine, reserpine, caffeine, oroidin, piperine, and hordenine;

phenols and polyphenols such as pyrogallol, malabaricone C, taxifolin, and rosmarinic acid;

surfactants having a quorum sensing inhibiting function such as rhamnolipid, trehalolipid, sophorolipid, cellobiopid, viscosin, surfactin, and emaruzan;

phenazines such as pyocyanin;

ubiquinone analogs such as piericidin A and glucopiericidin A;

eicosanoids such as Lipoxin A4;

oligosaccharides such as polygalacturonic acid and pectin;

macrolides such as erythromycin;

carotenoids such as zeaxanthin;

mycotoxins such as penicillic acid and patulin;

steroids such as cholesteryl chloride;

boronic acid and boronic acid derivatives such as 3-Fluoro-4-methylphenylboronic acid and 2-Fluoro-4-(trifluoromethyl)phenylboronic acid;

lactones such as acylated cyclopentylamide, and N-(3-oxododecanoyl)-L-homoserine lactone; and putenolides such as 3,4-dibromo-2(5H)-furanone.

The quorum sensing inhibitor (B) included in the composition according to the present invention is less than 0.1 in common logarithm log S of solubility in water at 25° C. The log S of the quorum sensing inhibitor (B) is preferably 0.01 or less, more preferably −0.1 or less, or further preferably −0.4 or less. The log S of the quorum sensing inhibitor (B) is generally −30 or more, or preferably −12 or more.

The log S of the quorum sensing inhibitor (B) is a common logarithm of an amount S of the quorum sensing inhibitor (B) soluble in 100 g of water at a temperature of 25° C. at pH 6 to 8 (solubility; g/100 g). A smaller log S indicates a lower solubility.

The log S of the quorum sensing inhibitor (B) can be easily estimated from a chemical structure of the quorum sensing inhibitor (B) by using computer software Hansen Solubility Parameter in Practice (HSPiP) even if a literature value or the like of the quorum sensing inhibitor (B) is unknown.

As the log S of the quorum sensing inhibitor (B) included in the composition according to the present invention, a value calculated by using HSPiP ver 5.0.04 or a literature value is used.

However, if the quorum sensing inhibitor (B) included in the composition according to the present invention is an ionic compound, a charge transfer complex, an inorganic compound, a compound whose number of atoms except hydrogen atoms is more than 120, or a compound that forms multiple hydrogen bonds with each other or another compound, the log S of such a quorum sensing inhibitor (B) is a value calculated by solubility measurement for measuring an amount of solute soluble in 100 g of water.

Examples of the quorum sensing inhibitor (B) with log S of less than 0.1 include phenylpropanoids with log S of less than 0.1, benzoic acid analogs with log S of less than 0.1, tannins with log S of less than 0.1, stilbene analogs and polyketides thereof with log S of less than 0.1, flavonoids with log S of less than 0.1, diarylheptanoids with log S of less than 0.1, terpenes and terpenoids with log S of less than 0.1, sulfur-containing compounds with log S of less than 0.1, nitrogen-containing compounds with log S of less than 0.1, coumarin derivatives with log S of less than 0.1, furanocoumarins with log S of less than 0.1, quinone derivatives with log S of less than 0.1, alkaloids with log S of less than 0.1, phenols and polyphenols with log S of less than 0.1, surfactants having a quorum sensing inhibiting function with log S of less than 0.1, phenazines with log S of less than 0.1, ubiquinone analogs with log S of less than 0.1, eicosanoids with log S of less than 0.1, carotenoids with log S of less than 0.1, mycotoxins with log S of less than 0.1, macrolides with log S of less than 0.1, oligosaccharoids with log S of less than 0.1, boronic acid and boronic acid derivatives with log S of less than 0.1, steroids with log S of less than 0.1, lactones with log S of less than 0.1, and putenolides with log S of less than 0.1.

Among these, preferable examples are phenylpropanoids with log S of less than 0.1, benzoic acid analogs with log S of less than 0.1, tannins with log S of less than 0.1, stilbene analogs and polyketides thereof with log S of less than 0.1, flavonoids with log S of less than 0.1, diarylheptanoids with log S of less than 0.1, terpenes and terpenoids with log S of less than 0.1, sulfur-containing compounds with log S of less than 0.1, nitrogen-containing compounds with log S of less than 0.1, coumarin derivatives with log S of less than 0.1, furanocoumarins with log S of less than 0.1, quinone derivatives with log S of less than 0.1, alkaloids with log S of less than 0.1, phenols and polyphenols with log S of less than 0.1, surfactants having a quorum sensing inhibiting function with log S of less than 0.1, phenazines with log S of less than 0.1, ubiquinone analogs with log S of less than 0.1, eicosanoids with log S of less than 0.1, carotenoids with log S of less than 0.1, mycotoxins with log S of less than 0.1, macrolides with log S of less than 0.1, oligosaccharoids with log S of less than 0.1, steroids with log S of less than 0.1, boronic acid and boronic acid derivatives with log S of less than 0.1, lactones with log S of less than 0.1, or putenolides with log S of less than 0.1, and more preferable examples are phenylpropanoids with log S of less than 0.1, benzoic acid analogs with log S of less than 0.1, tannins with log S of less than 0.1, stilbene analogs and polyketides thereof with log S of less than 0.1, flavonoids with log S of less than 0.1, diarylheptanoids with log S of less than 0.1, terpenes and terpenoids with log S of less than 0.1, sulfur-containing compounds with log S of less than 0.1, nitrogen-containing compounds with log S of less than 0.1, coumarin derivatives with log S of less than 0.1, quinone derivatives with log S of less than 0.1, alkaloids with log S of less than 0.1, boronic acid and boronic acid derivatives with log S of less than 0.1, or lactones with log S of less than 0.1, and further preferable examples are 2,3,4-trimethoxycinnamate, 2-fluorocinnamate, eugenol, salicylic acid, tannic acid, resveratrol, (−)-epicatechin, flavone, curcumin, carvacrol, phytol, diphenyl disulfide, indole, umbelliferone, purpurin, reserpine, berberine chloride hydrate, 3-Fluoro-4-methylphenylboronic acid, N-(3-oxododecanoyl)-L-homoserine lactone, or 2-Fluoro-4-(trifluoromethyl)benzeneboronic acid.

Examples of the phenylpropanoids with log S of less than 0.1 include eugenol, methyl eugenol, cinnamaldehyde, cinnamic acid, isovanillin, ferulic acid, cinnamaldehyde, methyl cinnamate, phenyl propionate, 2-methoxycinnamate, 3-methoxycinnamate, 4-methoxycinnamate, 3-bromocinnamate, 2-fluorocinnamate, 3-fluorocinnamate, 3-methylcinnamate, 4-acetoxycinnamate, 4-bromocinnamate, 4-ethoxycinnamate, 4-fluorocinnamate, 3,4-dimethoxycinnamate, 2,3-dimethoxycinnamate, 2,5-dimethoxycinnamate, 2,3,4-trimethoxycinnamate, 3,4,5-trimethoxycinnamate, and lignin.

Examples of the benzoic acid analogs with log S of less than 0.1 include salicylic acid, gallic acid, ellagic acid, and the like.

Examples of the tannins with log S of less than 0.1 include 1,2,3,4,6-pentagalloyl glucose, punicalagin, hamamelitannin, tannic acid, and the like.

Examples of stilbene analogs and polyketides thereof with log S of less than 0.1 include resveratrol, pterostilbene, and the like.

Examples of flavonoids with log S of less than 0.1 include (−)-epicatechin, (−)-catechin gallate, (−)-epicatechin gallate, (−)-gallocatechin gallate, (−)-epigallocatechin gallate, naringenin, flavone, apigenin, chrysin, acacetin, flavonol, kaempferol, quercetin, quercitrin, flavanone, isosakuranetin, pinostrobin, eriodictyol, malvidin, and the like.

Examples of diarylheptanoids with log S of less than 0.1 include curcumin and the like.

Examples of terpenes and terpenoids with log S of less than 0.1 include carvacrol, salvipisone, akantospermorid, isolimoninic acid, ichangin, betulic acid, ursolic acid, gymnemic acid, obacunone, deacetyl nomilinic acid glucoside, phytol, and the like.

Examples of sulfur-containing compounds with log S of less than 0.1 include allicin, sulforaphane, allyl isothiocyanate, iberin, diphenyl disulfide, and the like.

Examples of nitrogen-containing compounds with log S of less than 0.1 include indole, 2-methyltryptoline, and the like.

Examples of coumarin derivatives with log S of less than 0.1 include, aesculetin, umbelliferone, scopoletin, and the like.

Examples of furanocoumarins with log S of less than 0.1 include psoralen, angelicin, bergamotine, dihydroxy bergamotine, and the like.

Examples of quinone derivatives with log S of less than 0.1 include chrysophanol, emodin, shikonin, purpurin, embelin, and the like.

Examples of alkaloids with log S of less than 0.1 include berberine, berberine chloride hydrate, chelerythrine, sanguinarine, reserpine, oroidin, piperine, hordenine, and the like.

Examples of phenols and polyphenols with log S of less than 0.1 include malabaricone C, taxifolin, rosmarinic acid, and the like.

Examples of surfactants having a quorum sensing inhibiting function with log S of less than 0.1 include rhamnolipid, trehalolipid, sophorolipid, cellobiopid, viscosin, emaruzan, and the like.

Examples of phenazines with log S of less than 0.1 include pyocyanin and the like.

Examples of ubiquinone analogs with log S of less than 0.1 include piericidin A, glucopiericidin A, and the like.

Examples of eicosanoids with log S of less than 0.1 include Lipoxin A4.

Examples of carotenoids with log S of less than 0.1 include zeaxanthin and the like.

Examples of mycotoxins with log S of less than 0.1 include penicillic acid, patulin, and the like.

Examples of macrolides with log S of less than 0.1 include erythromycin and the like.

Examples of oligosaccharoids with log S of less than 0.1 include polygalacturonic acid, pectin, and the like.

Examples of steroids with log S of less than 0.1 include cholesteryl chloride and the like.

Examples of boronic acid and boronic acid derivatives with log S of less than 0.1 include 3-Fluoro-4-methylphenylboronic acid, 2-Fluoro-4-(trifluoromethyl)phenylboronic acid, and the like.

Examples of lactones with log S of less than 0.1 include N-(3-oxododecanoyl)-L-homoserine lactone and the like.

Examples of putenolides with log S of less than 0.1 include 3,4-dibromo-2(5H)-furanone and the like.

The quorum sensing inhibitor (B) may be carried by a carrier.

Examples of the carrier include:
zeolite;
montmorillonite;
activated carbon;
calcium phosphate-based compounds such as hydroxyapatite;
oxides such as silicon oxide, aluminum oxide, magnesium oxide, titanium oxide, and zirconium oxide;
nitrides such as silicon nitride, titanium nitride, aluminum nitride, and zirconium oxide;
non-oxide ceramics such as silicon carbide;
silicates such as calcium silicate, aluminum silicate, magnesium silicate, and diatomite; and
alumina-silica-based compounds such as kaolinite, bentonite; pumice, feldspar, and quartz.

The composition according to the present invention may include only one kind of quorum sensing inhibitor (B) or may include two or more kinds of the quorum sensing inhibitors (B).

[Composition]

The composition according to the present invention is configured such that a distance $Ra_1$ between a Hansen solubility parameter ($HSP_a$) of the at least one resin (A) selected from the group consisting of the thermoplastic resins and the thermosetting resins and a Hansen solubility parameter ($HSP_b$) of the quorum sensing inhibitor (B) is greater than 3.2 $MPa^{1/2}$, preferably 3.5 $MPa^{1/2}$ or greater, or more preferably 4.2 $MPa^{1/2}$ or greater. $Ra_1$ is generally 50 $MPa^{1/2}$ or less, or preferably 35 $MPa^{1/2}$ or less.

The Hansen solubility parameter (hereinafter, may be referred to as HSP) is defined by a 3-dimensional parameters of ($\delta D$, $\delta P$, $\delta H$) below, and represented by Equation (1') below. This idea (theory) proposed by Hansen is described in Hansen solubility parameter: A user's Handbook, second edition, C. M. Hansen (2007), Taylor and Francis Group, LLC (HSPiP manual).

$$HSP^2 = (\delta D)^2 + (\delta P)^2 + (\delta H)^2 \qquad (1')$$

$\delta D$: London dispersion force item
$\delta P$: Molecular polarization item (interdipole force item)
$\delta H$: Hydrogen bonding item $\delta D$, $\delta P$, and $\delta H$ can be calculated out, for example, from a chemical structural formula of the resin (A) and the quorum sensing inhibitor (B) by using computer software, Hansen Solubility Parameter in Practice (HSPiP). For the composition according to the present invention, values calculated out by using HSPiP ver. 5.0.04 are used.

In case where the at least one resin (A) selected from the group consisting of the thermoplastic resins and the thermosetting resins included in the composition according to the present invention and the quorum sensing inhibitor (B) are respectively copolymers each including two or more structural units, it is not possible to directly calculate out the Hansen solubility parameters by using the program mentioned above. In this case, Hansen solubility parameters of homopolymers of the respective structural units are calculated out, and the Hansen solubility parameters of the homopolymers of the respective structural units thus calculated out are averaged by volumetric ratios of the structural units included in the copolymers, thereby working out the averages as the Hansen solubility parameters of the copolymers. Here, the "averages by the volumetric ratios" are values worked out for each of $\delta D$, $\delta P$, and $\delta H$, and are each a sum of products worked out by multiplying Hansen solubility parameters $\delta D$, $\delta P$, or $\delta H$ of the homopolymers of the respective structural units with volume fractions of the structural units. Here, the "volume fraction" of a structural unit means (volume of the structural unit)/(total volume of the structural units in the copolymer).

The distance $Ra_1$ between $HSP_A$ and $HSP_B$ indicates a distance between the Hansen solubility parameters (HSPs)

of two materials. $Ra_1$ is a parameter indicating affinity between the two materials, and a smaller $Ra_1$ indicates a greater affinity between the two materials.

Assuming that a Hansen solubility parameter $HSP_\alpha$ of a material α and a Hansen solubility parameter $HSP_\beta$ of a material β are $$HSP_\alpha = (\delta D_\alpha, \delta P_\alpha, \delta H_\alpha), \text{ and}$$

$$HSP_\beta = (\delta D_\beta, \delta P_\beta, \delta H_\beta), \text{ and}$$

the distance (Ra) between $HSP_\alpha$ and $HSP_\beta$ can be worked out by Equation (2') below:

$$Ra = [4 \times (\delta D_\alpha - \delta D_\beta)^2 + (\delta P_\alpha - \delta P_\beta)^2 + (\delta H_\alpha - \delta H_\beta)^2]^{1/2} \quad (2')$$

Preferably the composition according to the present invention is such that a content of the at least one resin (A) selected from the group consisting of the thermoplastic resins and the thermosetting resins is in a range of 70 to 99.99 wt %, and a content of the quorum sensing inhibitor (B) is in a range of 0.01 to 30 wt %, where the total amount of the at least one resin (A) selected from the group consisting of the thermoplastic resins and the thermosetting resins and the quorum sensing inhibitor (B) is 100 wt %. It is more preferable that the content of the at least one resin (A) selected from the group consisting of the thermoplastic resins and the thermosetting resins be in a range of 90 to 99.9 wt %, and a content of the quorum sensing inhibitor (B) be in a range of 0.1 to 10 wt %. It is further preferable that the content of the at least one resin (A) selected from the group consisting of the thermoplastic resins and the thermosetting resins be in a range of 95 to 99.9 wt %, and a content of the quorum sensing inhibitor (B) be in a range of 0.1 to 5 wt %.

[Antimicrobial/Antifungal Agent (C)]

The composition according to the present invention may further include an antimicrobial/antifungal agent (C).

Examples of the antimicrobial/antifungal agent include:

phenol and alcohol-type antimicrobial/antifungal agents such as methyl-2,4-dihydroxy-6-methylbenzoate, ethyl-2,4-dihydroxy-6-methylbenzoate, methyl-2,4-dihydroxy-3,6-dimethylbenzoate, isopropyl-2,4-dihydroxy-6-methylbenzoate, 3-methoxy-5-methylphenyl-2,4-dihydroxy-6-methylbenzoate, ethyl-2,4-dihydroxy-3,6-dimethylbenzoate, ethyl-3-formyl-2,4-dihydroxy-6-methylbenzoate, isopropyl-3-formyl-2,4-dihydroxy-6-methylbenzoate, 3-hydroxy-5-methylphenyl-2,4-dihydroxy-6-methylbenzoate, 3-hydroxy-5-methylphenyl-2-dihydroxy-4-methoxy-6-methylbenzoate, 3-methoxy-5-methylphenyl-2-hydroxy-4-methoxy-6-methylbenzoate, and 3-chloro-2,6-dihydroxy-4-methylbenzoate;

pyridine/quinoline-type antimicrobial/antifungal agents such as sodium (2-pyridylthio-1-oxide), nalidixic acid, gatifloxacin, copper pyrithione, and zinc pyrithione;

triazine-type antimicrobial/antifungal agents such as hexahydro-1,3,5-tris(2-hydroxyethyl)-S-triazine;

isothiazolone-type antimicrobial/antifungal agents such as 1,2-benzisothiazolin-3-one, 2-methyl-5-chloro-4-isothiazolone complex, octylisothiazolinone, methylisothiazolinone, chloromethylisothiazolinone, dichlorooctylisothiazolinone, and enzisothiazolinone;

anilide-type antimicrobial/antifungal agents such as 4'-hytroxyacetanilide, N-(3-hydroxyphenyl)benzene carboxamide, and N-(3-hydroxyphenyl)benzamide;

nitrile-type antimicrobial/antifungal agents such as monobromocyanoacetamide, dibromocyanoacetamide, 1,2-dibromo-2,4-dicyanobutane, and tetrachlorophthalonitrile;

imidazole/thiazole-type antimicrobial/antifungal agents such as 2-(4-thiazolyl)benzimidazole, 2-benzimidazolemethylcarbamate, and 1-(butylcarbamoyl)-2-benzimidazolemethylcarbamate;

aldehyde-type antimicrobial/antifungal agents such as dehydroacetic acid;

carboxylic acid-type antimicrobial/antifungal agents such as sorbic acid;

ester-type antimicrobial/antifungal agents such as para-hydroxybenzoate;

disulfide compounds such as dithio-2,2-bis(benzmethylamide), tetramethylthiuram disulfide, and dimethylphenylsulfamide;

thiocarbamate compounds such as manzeb, maneb, zineb, and polycarbamate;

nitro compounds such as 1,1-dibromo-1-nitropropanol, and 1,1-dibromo-1-nitro-2-acetoxypropane;

quaternary ammonium salts such as benzalkonium chloride, benzethonium chloride, methyl benzethonium chloride, cetylpyridinium chloride, cetrimonium, dofanium chloride, tetraethylammonium bromide, didecyldimethylammonium chloride, and domiphen bromide;

biguanides such as metformin, buformin, phenformin, proguanil, chlorproguanil, chlorhexidine, alexidine, polyaminopropyl biguanide, and polyhexanide;

surfactants such as sodium alkylbenzene sulfonate, polyoxyethylene nonyl phenyl ether, polyoxyethylene oleyl ether, polyoxyethylene stearyl amine, and lauryl dimethyl benzyl ammonium chloride; and inorganic antimicrobial agents such as silver-carried zeolite, copper-carried zeolite, zinc-carried zeolite, silver-carried calcium phosphate, copper-carried calcium phosphate, zinc-carried calcium phosphate, and titanium oxide.

Among them, preferable examples are phenol and alcohol-type antimicrobial/antifungal agents, pyridine/quinoline-type antimicrobial/antifungal agents, isothiazolone-type antimicrobial/antifungal agents, nitrile-type antimicrobial/antifungal agents, imidazole/thiazole-type antimicrobial/antifungal agents, aldehyde-type antimicrobial/antifungal agents, carboxylic acid-type antimicrobial/antifungal agents, ester-type antimicrobial/antifungal agents, quaternary ammonium salt, biguanides, surfactants, and inorganic antimicrobial agents. More preferable examples are pyridine/quinoline-type antimicrobial/antifungal agents, isothiazolone-type antimicrobial/antifungal agents, and imidazole/thiazole-type antimicrobial/antifungal agents. Further preferable examples are thiabendazole, zinc pyrithione, and octylisothiazolinone.

In case where the composition according to the present invention includes the antimicrobial/antifungal agent (C), the composition according to the present invention may include only one kind of antimicrobial/antifungal agent (C) or may include two or more kinds of antimicrobial/antifungal agents (C).

The common logarithm log S of the solubility of the antimicrobial/antifungal agent (C) in water at 25° C. and at pH 6 to 8 is preferably in a range of 1 or less, more preferably in a range of −0.6 or less, further preferably in a range of −1 or less, or still more preferably in a range of −1.5 or less.

The antimicrobial/antifungal agent (C) may be carried by a carrier.

Examples of the carrier for the antimicrobial/antifungal agent (C) may include the carriers exemplified as carriers of the quorum sensing inhibitor (B).

If the composition according to the present invention includes the antimicrobial/antifungal agent (C), preferably the at least one resin (A) selected from the group consisting of the thermoplastic resins and the thermosetting resins is in a range of 80 to 99.98 wt %, a content of the quorum sensing inhibitor (B) is in a range of 0.01 to 10 wt %, and a content of the antimicrobial/antifungal agent (C) is in a range of 0.01 to 10 wt %, where the total amount of the at least one resin (A) selected from the group consisting of the thermoplastic resins and the thermosetting resins, the quorum sensing inhibitor (B), and the antimicrobial/antifungal agent (C) is 100 wt %. It is more preferable that the content of the at least one resin (A) selected from the group consisting of the thermoplastic resins and the thermosetting resins be in a range of 90 to 99.8 wt %, a content of the quorum sensing inhibitor (B) be in a range of 0.1 to 5 wt %, and a content of the antimicrobial/antifungal agent (C) is in a range of 0.1 to 5 wt %.

[Surface Modifier (D)]

The composition according to the present invention may further include a surface modifier (D). In this description, what is meant by the term "surface modifier" is a compound that changes a surface free energy of a molded body according to whether the surface modifier is present or not.

Examples of the surface modifier (D) include:

fluorine-containing surfactants such as nonafluoro-1-butanesulfonate, tridecafluoroheptanate, heptadecafluorooctanesulfonate, heptadecafluorononanoate, heneicosafluoroundecanoate, 2H,2H,3H,3H-heptadecafluoroundecanoate, ammonium pentadecafluorooctanoate, lithium nonafluoro-1-butane sulfonate, potassium heptadecafluoro-1-octanesulfonate, Surflon S-431, Surflon S-461, and Surflon S-420;

perfluoropolyether group-containing compounds described in WO 2014/080873 A;

fluorine-containing monomers such as 1H,1H,2H,2H-heptadecafluorodecyl acrylate;

alkylsiloxy group-containing compounds described in RSC Adv. 2015, 5, 53054-53062;

polyalkylene ether group-containing compounds described in JP-A-2017-115044;

betaine-type compounds described in JP-A-2002-069178; and surfactants such as glycerin monostearate.

Among them, preferable examples are fluorine-containing surfactants, perfluoropolyether group-containing compounds, fluorine-containing monomers, polyalkylene ether group-containing compounds, betaine-type compounds, and surfactants. More preferable examples are fluorine-containing surfactants, fluorine-containing monomers, and polyalkylene ether group-containing compounds. Further preferable examples are 1H,1H,2H,2H-heptadecafluorodecyl acrylate, Surflon S-431, Surflon S-461, and Surflon S-420.

If the composition according to the present invention includes the surface modifier (D), preferably a content of the at least one resin (A) selected from the group consisting of the thermoplastic resins and the thermosetting resins is in a range of 60 to 98.99 wt %, a content of the quorum sensing inhibitor (B) is in a range of 0.01 to 10 wt %, and a content of the surface modifier (D) is in a range of 1 to 30 wt %, where the total amount of the at least one resin (A) selected from the group consisting of the thermoplastic resins and the thermosetting resins, the quorum sensing inhibitor (B), and the surface modifier (D) is 100 wt %. It is more preferable that the content of the at least one resin (A) selected from the group consisting of the thermoplastic resins and the thermosetting resins be in a range of 75 to 98.9 wt %, a content of the quorum sensing inhibitor (B) be in a range of 0.1 to 5 wt %, and a content of the surface modifier (D) is in a range of 1 to 20 wt %.

If the composition according to the present invention includes the antimicrobial/antifungal agent (C) and the surface modifier (D), preferably the at least one resin (A) selected from the group consisting of the thermoplastic resins and the thermosetting resins is in a range of 50 to 98.98 wt %, a content of the quorum sensing inhibitor (B) is in a range of 0.01 to 10 wt %, a content of the antimicrobial/antifungal agent (C) is in a range of 0.01 to 10 wt %, and the surface modifier (D) is in a range of 1 to 30 wt %, where the total amount of the at least one resin (A) selected from the group consisting of the thermoplastic resins and the thermosetting resins, the quorum sensing inhibitor (B), the antimicrobial/antifungal agent (C), and the surface modifier (D) is 100 wt %. It is more preferable that the content of the at least one resin (A) selected from the group consisting of the thermoplastic resins and the thermosetting resins be in a range of 70 to 98.8 wt %, a content of the quorum sensing inhibitor (B) be in a range of 0.1 to 5 wt %, a content of the antimicrobial/antifungal agent (C) is in a range of 0.1 to 5 wt %, and a content of the surface modifier (D) is in a range of 1 to 20 wt %.

The composition according to the present invention may include an additive such as an anti-oxidant, a corrosion inhibitor, an ultraviolet absorbing agent, a light stabilizer, an organism adhesion inhibiting agent, an organism repellant, an antibiotic, an anti-viral agent, a deodorant, a pigment, a flame retardant, an anti-static agent, a lubricant, a filler, a plasticizer, a nucleating agent, an anti-blocking agent, a foaming agent, an emulsifying agent, a glossing agent, a binding agent, a compatibilizer, a polymerization inhibitor, a shrinkage lowering agent, a curing agent, a cross-linking agent, an accelerant, a mold-releasing agent, a thickener, and fiber.

Examples of the anti-oxidant include a phenol-based anti-oxidant, a sulfur-based anti-oxidant, a phosphorous-based anti-oxidant, and a hindered amine-based anti-oxidant.

Examples of the phenol-based anti-oxidant include N-octadecyl-3-(4-hydroxy-3,5-di-tert-butylphenyl)propionate, 2,6-di-tert-butyl-4-methylphenol, 2,2-thio-diethylene-bis-[3-(3,5-di-tert-butyl-4-hydroxyphenyl)propionate], tri-ethyleneglycol-bis-[3-(3-tert-butyl-5-methyl-4-hydroxyphenyl)propionate], 3,9-bis[2-{3-(3-tert-butyl-4-hydroxy-5-methylphenyl)propionyloxy}-1,1-dimethylethyl]-2,4,8,10-tetraoxaspiro[5.5]undecane, tetrakis{3-(3,5-di-tert-butyl-4-hydroxyphenyl)propionate}pentaerythrityl ester, 2-tert-butyl-6-(3-tert-butyl-2-hydroxy-5-methylbenzyl)-4-methylphenylacrylate, 2-[1-(2-hydroxy-3,5-di-tert-pentylphenyl)ethyl]-4,6-di-tert-pentylphenylacrylate, 1,3,5-trimethyl-2,4,6-tris(3,5-di-tert-butyl-4-hydroxybenzyl)benzene, tris(3,5-di-tert-butyl-4-hydroxybenzyl)isocyanurate, 1,3,5-tris(4-tert-butyl-3-hydroxy-2,6-dimethylbenzyl)-1,3,5-triazine-2,4,6-(1H,3H,5H)-trione, 2,2'-methylenebis(6-tert-butyl-4-methylphenol), 4,4'-butylidenebis(6-tert-butyl-3-methylphenol), and 4,4'-thiobis(6-tert-butyl-3-methylphenol).

Examples of the sulfur-based anti-oxidant include 3,3'-thiodipropionatedi-N-dodecylester, 3,3'-thidipropionatedi-N-tetradecylester, 3,3-thiodipropionatedi-N-octadecylester, and tetrakis(3-dodecylthiopropionate)pentaerythrityl ester.

Examples of the phosphorous-based anti-oxidant include tris(2,4-di-tert-butylphenyl)phosphite, bis(2,4-di-tert-butylphenyl)pentaerythritoldiphosphite, bis(2,6-di-tert-butyl-4-methylphenyl)pentaerythritoldiphosphite, bis(2,4-di-cumylphenyl)pentaerythritoldipphosphite, tetrakis(2,4-di-tertbutylphenyl)-4,4'-biphenylenediphosphonite, and bis-[2,4-tert-butyl, (6-methyl)phenyl]ethylphosphite.

Examples of the hindered amine-based anti-oxidant include, sebacic acid bis(2,2,6,6-tetramethyl-4-piperidyl) ester, and 2,2,6,6-tetramethyl-4-piperidylmethacrylate, poly [{6-(1,1,3,3-tetramethylbutyl)amino-1,3,5-triazine-2,4-diyl}{(2,2,6,6-tetramethyl-4-piperidyl)imino}-1,6-hexamethylene{(2,2,6,6-tetramethyl-4-piperidyl)imino}].

Examples of the corrosion inhibitor include alkanol amines, quaternary ammonium salt, alkane thiols, imidazoline, sodium metavanadate, bismuth citrate, phenol derivatives, polyalkenyl amines, alkyl imidazoline derivatives, dianoalkyl amine, carboxamide, alkylene diamines, pyrimidine and carboxylic acid thereof, naphthenic acid, sulfonic acid complex, calcium nitrite, alkyl amines and esters, polyalcohols, polyphenol, alkanol amines, sodium molybdate, sodium tungstate, sodium nitrite, sodium phosphonate, sodium chromate, sodium silicate, gelatin, polymers of carboxylic acid, aliphatic amines, aliphatic diamines, aromatic amines, aromatic diamines, ethoxylated amines, imidazole, benzimidazole, nitro compounds, formaldehyde, acetylene alcohol, aliphatic thiols, aliphatic sulfide, aromatic thiol, aromatic sulfide, sulfoxide, thiourea, acetylene alcohol, 2-mercapto benzimidazole, mixtures of an amine or a quaternary ammonium salt and a halogen ion, mixtures of acetylene thiol, sulfide, dibenzyl sulfoxide, an alkylamine, and potassium iodide, mixtures of dicyclohexylamine nitrite, cyclohexylamine benzoate, benzotriazole, tannin, and sodium phosphate, a mixture of triethanolamine, lauryl sarcosine, and benzotriazole, and mixtures of alkylamine, benzotriazole, sodium nitrite, and sodium phosphate.

Examples of the ultraviolet absorbing agent and the light stabilizer include 2-(5-methyl-2-hydroxyphenyl)benzotriazole, 2-[2-[hydroxy-3,5-bis(A,A-dimethylbenzyl)phenyl]-2H-benzotriazole, 2-(3-tert-butyl-5-methyl-2-hydroxyphenyl)-5-chlorobenzotriazole, 2-(2'-hydroxy-5'-tert-octylphenyl)benzotriazole, methyl-3-[3-tert-butyl-5-(2H-benzotriazole-2-yl)-4-hydroxyphenyl]propionate-polyethyleneglycol, hydroxyphenyl benzotriazole derivatives, 2-(4,6-diphenyl-1,3-5-triazine-2-yl)-5[(hexyl)oxy]-phenol, and 2-ethoxy-2'-ethyl-oxalic acid bisanilide.

Examples of the organism adhesion inhibiting agent include tetramethylthiuram disulfide, zinc bis(N,N-dimethyldithiocarbamate), 3-(3,4-dichlorophenyl)-1,1-dimethylurea, dichloro-N-((dimethylamino)sulfonyl)fluoro-N—(P-tolyl)methanesulfenamide, pyridine-triphenyl borane, N,N-dimethyl-N'-phenyl-N'-(fluorodichloromethylthio)sulfamide, copper (I) thiocyanate, copper (I) oxide, tetrabutylthiuram disulfide, 2,4,5,6-tetrachloroisophthalonitril, zinc ethylene bisdithiocarbamate, 2,3,5,6-tetrachloro-4-(methylsulfonyl) pyridine, N-(2,4,6-trichlorophenyl)maleimide, zinc bis(2-pyridinethiol-1-oxide), copper bis(2-pyridinethiol-1-oxide), 2-methylthio-4-tert-butylamino-6-cyclopropylamino-S-triazine, alkylpyridine compounds, graminebased compounds, and isotonyl compounds.

Examples of the deodorant include organic acids, metal aliphatic acids, metal compounds, cyclodextrins, and porous materials.

Examples of the organic acids include lactic acid, succinic acid, malic acid, citric acid, maleic acid, malonic acid, ethylenediamine polyacetate, alkane-1,2-dicarboxylic acid, alkene-1,2-dicarboxylic acid, cycloalkane-1,2-dicarboxylic acid, cycloalkene-1,2-dicarboxylic acid, and naphthalene sulfonic acid.

Examples of the metal aliphatic acids include zinc undecylenate, zinc 2-ethylhexanoate, and zinc ricinoleate.

Examples of the metal compounds include iron oxide, iron sulfate, zinc oxide, zinc sulfate, zinc chloride, silver oxide, oxidized steel, metal (iron, copper, or the like) sodium chlorophyllin, metal (iron, copper, cobalt, or the like) phthalocyanine, metal (iron, copper, cobalt, or the like) phthalocyanine tetrasulfonic acid, titanium dioxide, and visible light responding titanium dioxide (nitrogen-doped type and the like).

Examples of the cyclodextrins include α-cyclodextrin, β-cyclodextrin, γ-cyclodextrin, methyl derivatives thereof, hydroxypropyl derivatives thereof, glucosyl derivatives thereof, and maltosyl derivatives.

Examples of components constituting the porous material include polyunsaturated carboxylic acid, aromatic polymers, chitin, chitosan, activated carbon, silica gel, activated alumina, zeolite, and ceramics.

Examples of the polyunsaturated carboxylic acid include polymethacrylate, and polyacrylate.

Examples of the aromatic polymers include polydivinylbenzene, styrene-divinylbenzene-vinylpyridine copolymer, and divinylbenzene-vinylpyridine copolymer.

Examples of the pigment include carbon black, titanium oxide, phthalocyanine-based pigment, quinacridone-based pigment, isoindoline-based pigment, perylene-based pigment, Peniline-based pigment, quinophthalone-based pigment, diketo-pyrrolo-pyrrole-based pigment, dioxazine-based pigment, condensed disazo-based pigment, and benzimidazolone-based pigment.

Examples of the flame retardant include decabromobiphenyl, antimony trioxide, phosphorous-containing flame retardant, and aluminum hydroxide.

Examples of the anti-static agent include cationic surfactants, amphoteric surfactants, anionic surfactants, and nonionic surfactants.

The examples of the cationic surfactants include quaternary ammonium salts, primary amine salts, secondary amine salts, and tertiary amine salts, quaternary amine salts, and pyridine derivatives.

The examples of the amphoteric surfactants include betaine-type surfactants, carboxylic acid derivatives, and imidazoline derivatives.

Examples of the anionic surfactant include alkyl phosphate-based surfactants, sulfonated oil, soap, sulfonated ester oil, sulfonated amide oil, sulfonated ester salt of olefins, sulfate ester salts of aliphatic alcohols, alkyl sulfate ester salts, aliphatic acid ethyl sulfonates, alkyl naphthalene sulfonates, alkyl benzene sulfonates, succinic acid ester sulfonate, and phosphoric acid ester salts.

Examples of the nonionic surfactants include multivalent alcohols partially esterified with an aliphatic acid, ethylene oxide-added aliphatic alcohols, ethylene oxide-added aliphatic acid, ethylene oxide-added aliphatic amino or aliphatic amides, ethylene oxide-added alkyl phenols, ethylene oxide-added multivalent alcohols partially esterified with an aliphatic acid, and polyethylene glycol.

Examples of the curing agent include tertiary ($C_4$ to $C_{10}$) alkyl peroxybenzoates such as t-butyl peroxybenzoate, t-amyl peroxybenzoate, 1,1-dimethylbutyl peroxybenzoate, 1,1,2-trimethylpropyl peroxybenzoate, and 1,1,3,3-tetramethylbutyl peroxybenzoate; tertiary ($C_4$-$C_{10}$) alkylperoxy branched ($C_4$-$C_{10}$) alkyl esters such as t-butylperoxy-2-ethylhexanoate, t-amylperoxy-2-ethylhexanoate, 1,1-dimethylbutylperoxy-2-ethylhexanoate, 1,1,2-trimethylpropylperoxy-2-ethylhexanoate, 1,1,3,3-tetramethylbutylperoxy-2-ethylhexanoate, t-butylperoxyneodecanoate, t-butylperoxypivalate, 1,1-dimethylbutylperoxypivalate, 1,1,2-trimethylpropylperoxypivalate, t-butylperoxyisobutyrate, t-butylperoxyacetate, t-butylperoxy-3,5,5-trimethylhexanoate, t-amylperoxy-3,5,5-trimethylhexanoate, 1,1-dimethylbutylperoxy-3,5,5-trimethylhexanoate, and 1,1,2-trimethylpropylperoxy-3,5,5-trimethylhexanoate; ketone peroxides such as methyl ethyl ketone peroxide, methyl isopropyl ketone peroxide, methyl isobutyl ketone peroxide, and cyclohexanone peroxide; peroxymonocarbonates such as t-butyl peroxyisopropyl carbonate, t-amylperoxy isopropyl carbonate, 1,1-dimethylbutyl peroxyisopropyl carbonate, 1,1,2-trimethylpropylperoxyisopropyl carbonate, t-butylperoxy-2-ethylhexylcarbonate, t-amylperoxy-2-ethylhexylcarbonate, 1,1-dimethylbutylperoxy-2-ethylhexylcarbonate, 1,1,2-trimethylperoxypropylcarbonate, and 1,1,3,3-tetramethylbutylperoxy-2-ethylhexylcarbonate; hydroperoxides such as o-diisopropylbenzene monohydroperoxide, m-diisopropylbenzene monohydroperoxide, p-diisopropylbenzene monohydroperoxide, o-diisopropylbenzene dihydroperoxide, m-diisopropylbenzene dihydroperoxide, p-diisopropylbenzene dihydroperoxide.

Examples of the cross-linking agent include divinyl benzene, trivinyl benzene, ethylene glycol di(meth)acrylate, polyfunctional isocyanate, buta-1,3-diene, divinyl benzene, diallyl phthalate, dihydrodicyclopentadienyl acrylate diallyl maleate, and allyl (meth)acrylate.

Examples of the polymerization inhibitor include quinones such as parabenzoquinone, toluquinone, naphthoquinone, phenanthraquinone, 2,5-diphenylparabenzoquinone; hydroquinones such as toluhydroquinone, hydroquinone, tertiary butyl catechol, monotertiary butyl hydroquinone, and 2,5 ditertiary butyl hydroquinone; and monophenols such as hydroquinone monomethyl ether, 2,6-di-t-butyl-p-cresol.

Examples of the shrinkage lowering agent include thermoplastic resins such as polystyrene, polymethyl methacrylate, polyvinyl acetate, saturated polyester, and styrene-butadiene rubber.

Examples of the accelerant include cobalt naphthenate, cobalt octenoate, manganese naphthenate, copper naphthenate, cobalt octenoate, and copper octenoate.

Examples of the mold releasing agent include lime soap such as zinc stearate and calcium stearate, fluorine-containing organic compounds, and phosphoric acid-containing compounds.

Examples of the thickener include oxides and hydroxide of magnesium, calcium, and the like.

Examples of the fibers include glass chopped strands, milled glass fibers, roving glass, and the like.

A production method of the composition according to the present invention is not particularly limited.

The composition according to the present invention may be produced by melting and kneading at least one resin (A) selected from the thermoplastic resins and the thermosetting resins, and a quorum sensing inhibitor (B), and if necessary, an antimicrobial/antifungal agent (C), a surface modifier (D), and/or another additive, and after that, cooling a mixture thus prepared. The composition according to the present invention may be produced by pelleting the mixture by using a pelletizer after the mixture is prepared by the melting and kneading.

The composition according to the present invention may be produced by melting and kneading, in advance, at least one resin (A) selected from the thermoplastic resins and the thermosetting resins, and a quorum sensing inhibitor (B), and if necessary, an antimicrobial/antifungal agent (C), a surface modifier (D), and/or another additive thereby to prepare a master batch of a high concentration, and further adding (the) at least one resin (A) selected from the thermoplastic resins and the thermosetting resins into the master batch, and melting and kneading the master batch thereby to prepare the composition.

The composition according to the present invention may be produced by mixing monomer or prepolymer of at least one resin (A) selected from the thermoplastic resins and the thermosetting resins, and a quorum sensing inhibitor (B), and if necessary, an antimicrobial/antifungal agent (C), a surface modifier (D), and/or another additive, and the production may further include polymerizing a mixture thus prepared, thereby to prepare the composition. Examples of a method of the polymerization include bulk polymerization, cast polymerization, solution polymerization, dispersion polymerization, and emulsion polymerization.

It is possible to produce a molded body from, as a raw material, the composition thus prepared by any of the methods described above.

[Molded Body]

It is possible to produce a molded body including a composition according to the present invention by molding the composition according to the present invention.

A method of molding the composition according to the present invention is not particularly limited and examples of the method of molding include injection molding, extrusion molding, vacuum molding, pressure molding, press molding, transfer molding, cast molding, compression molding, lamination molding, and the like.

Examples of the molded body according to the present invention include injection-molded bodies, extrusion-molded bodies, vacuum-molded bodies, pressure-molded bodies, press-molded bodies, films, and the like. The molded body according to the present invention may have a single-layer structure or a multi-layer structure.

[Multi-Layer Structure]

The molded body according to the present invention may be a multi-layer structure including a layer made from a composition according to the present invention and a layer different from that layer. The multi-layer structure may be preferably configured such that the layer made from the composition according to the present invention constitutes at least one of surfaces of the multi-layer structure. Examples of a material constituting the layer different from the layer made from the composition according to the present invention include resins different from the composition according to the present invention, metals, paper, leathers, and the like. The multi-layer structure may be produced by adhering a layer made from a composition according to the present invention with a layer different from that layer.

The molded body according to the present invention may be preferably configured such that a dispersion force component $\gamma^d$ of a surface free energy thereof is 25 mN/m or less, or that a sum of a dipole force component $\gamma_p$ and a hydrogen bonding component $\gamma^h$ of the surface free energy is 30 mN/m or more. The molded body according to the present invention may be more preferably configured such that $\gamma^d$ is 20 mN/m or less, or that the sum of $\gamma^p$ and $\gamma^h$ is 40 mN/m or more. The molded body according to the present invention may be further preferably configured such that $\gamma^d$ is 16 mN/m or less, or that the sum of $\gamma^p$ and $\gamma^h$ is 80 mN/m or more. The dispersion force component $\gamma^d$ of the surface free energy of the molded body according to the present invention is generally 0 mN/m or more.

A surface free energy is divided into a dispersion item ($\gamma^d$), a hydrogen bonding item ($\gamma^h$), and a dipole item ($\gamma^p$).

The surface free energy of a molded body according to the present invention is worked out by using the method proposed by Kitabata and Hata.

In the method proposed by Kitabata and Hata, it is assumed that the surface free energy γ consists of a dispersion force component ($\gamma^d$), a dipole force component $\gamma^p$, and a hydrogen bonding component $\gamma^h$, and the surface free energy γ is represented by the following equation:

$$\gamma = \gamma^d + \gamma^p + \gamma^h \quad (1).$$

In this case, relationship between a surface energy $\gamma_1$ of a liquid, a surface energy $\gamma_s$ of a solid, and a contact angle θ is represented by the following relationship:

$$\gamma_L(1 + \cos\theta) = 2\sqrt{\gamma_S^d \gamma_L^d} + 2\sqrt{\gamma_S^p \gamma_L^p} + 2\sqrt{\gamma_S^h \gamma_L^h} \quad (2)$$

Using three kinds of liquids whose components of $\gamma_1$ are known, the contact angle θ is measured with each of the liquids, and a simultaneous equation regarding
$\gamma_S^d$,
$\gamma_S^p$, and
$\gamma_S^h$
is solved, thereby working out the components of the surface free energy of the molded body.

Examples of a method of configuring the molded body according to the present invention such that the dispersion force component $\gamma^d$ of the surface free energy thereof is 25 mN/m or less, or that the sum of the dipole force component $\gamma_p$ and a hydrogen bonding component $\gamma^h$ of the surface free energy is 30 mN/m or more include a method including causing the composition to include the surface modifier (D) in order to attain the predetermined value of the surface free energy of the molded body, a method including causing the composition to include a below-described surface modifying thermoplastic resin (A') as at least part of the at least one resin (A) selected from the group consisting of the thermoplastic resins and the thermosetting resins in order to attain the predetermined value of the surface free energy of the molded body.

Surface Modifying Thermoplastic Resins (A'):

the polymer (A1), the polymer (A2), fluoroalkyl group-containing polymers, acrylic and methacrylic resins including a monomer unit derived from (meth)acrylate in which the monomer unit derived from (meth)acrylate is a $C_{10}$ or more monomer unit, ethylene-(meth)acrylate ester copolymers including a monomer unit derived from (meth)acrylate in which the monomer unit derived from (meth)acrylate is a $C_{10}$ or more monomer unit and ionomer resins thereof, polyether-polypropylene block copolymers, polyether ester amide, ethylene-(meth)acrylate resin and ionomer resins thereof, vinyl alcohol-based resins, and cellulose resins.

Examples of the acrylic and methacrylic resins including a monomer unit derived from (meth)acrylate in which the monomer unit derived from (meth)acrylate is a $C_{10}$ or more monomer unit include octadecyl (meth)acrylate polymer, hexadecyl (meth)acrylate polymer, and tetradecyl (meth)acrylate polymer.

Examples of the ethylene-(meth)acrylate ester copolymers including a monomer unit derived from (meth)acrylate in which the monomer unit derived from (meth)acrylate is a $C_{10}$ or more monomer unit include ethylene-octadecyl (meth)acrylate copolymer, ethylene-hexadecyl(meth)acrylate copolymer, ethylene-tetradecyl(meth)acrylate copolymer, and ethylene-octadecyl(meth)acrylate-methyl(meth)acrylate copolymer.

In order to give the molded body according to the present invention the surface free energy whose dispersion force component $\gamma^d$ is 25 mN/m or less, it is possible to employ, for example, a fluorine-containing surfactant, a perfluoropolyether group-containing compound, an alkylsiloxy group-containing compound, or a fluorine-containing monomer as the surface modifier (D).

In order to give the molded body according to the present invention the surface free energy in which the sum of the dipole force component $\gamma_p$ and the hydrogen bonding component $\gamma_h$ of the surface free energy is 30 mN/m or more, it is possible to employ, for example, a surfactant such as a polyalkylene ether group-containing compound, a betaine-type compound, or glycerin monostearate, as the surface modifier (D).

In order to give the molded body according to the present invention the surface free energy whose dispersion force component $\gamma^d$ is 25 mN/m or less, it is possible to employ, as the surface modifying thermoplastic resin (A'), the polymer (A1), the polymer (A2), a fluoroalkyl group-containing polymer, an acrylic or methacrylic resin including a monomer unit derived from (meth)acrylate in which the monomer unit derived from (meth)acrylate is a $C_{10}$ or more monomer unit, an ethylene-(meth)acrylate ester copolymer including a monomer unit derived from (meth)acrylate in which the monomer unit derived from (meth)acrylate is a $C_{10}$ or more monomer unit, or an ionomer resin thereof.

In order to give the molded body according to the present invention the surface free energy in which the sum of the dipole force component $\gamma_p$ and the hydrogen bonding component $\gamma_h$ of the surface free energy is 30 mN/m or more, it is possible to employ, as the surface modifying thermoplastic resin (A'), a polyether-polypropylene block copolymer, polyether ester amide, or ethylene-(meth)acrylate resin, or an ionomer resin thereof.

Examples of the ionomer resin of the ethylene-(meth)acrylate resin include a potassium ionomer of ethylene-methacrylate copolymer.

By employing the molded body according to the present invention to goods listed below, it is possible to reduce a biofilm adhesion amount on a surface of the goods.

Examples of the goods to which the molded body including the composition according to the present invention is applicable
include:

kitchen goods and materials and parts such as tableware, various cooking goods and materials, storage containers, water purification pods, water purification systems, drains, triangular sink tidies, various parts of sinks, water storage pods, heat insulating pods, plastic wraps, kitchen hoods; toiletries and parts thereof such as washstands, washbowls, drain stoppers, hair catchers, and drain traps;

bathroom goods and materials and parts thereof such as bathroom walls, bathtubs, taps, as mirrors; washing parts; toilet utensils and parts thereof such as toilet seats, toilet lids, and toilet; various piping; various packings, various water storage goods and facilities such as water storage tanks, water storing tanks, solar water heaters, water tanks, and pools; various wrapping materials such as food wrapping materials and cosmetic goods wrapping materials; various indoor facilities such as ventilating fans, window frames, screen doors, sashes, and artificial marbles; outdoor facilities such as electric power cables, antennas, roof materials, house outer walls, and window glass; various home appliances and parts thereof provided thereto such as air conditioner, air conditioner drain pans, various hoses, heat exchangers for air conditioning facilities, humidifying devices, drying devices, refrigerators, dish washers, dish dryers, washing machines, vacuum cleaners, drink servers, coffee server, microwave ovens, irons, steamers, aroma diffusers, home cleaning devices, high-pressure washers, hot water dispensers, and wearable devices; various medical supplies such as nasogastric tubes, wound contact layers, catheters, tube stents, pacemaker shells, cardiac valves, orthopedic implants, periodontal implants, orthodontic devices, orthodontic tools other than the orthodontic devices, artificial teeth, tooth crowns, face masks, contact lens, intraocular lens, soft tissue implants, surgical tools, suture threads, cochlear implants, tympanic cavity forming tubes, shunts, postoperative drainage tubes, drainage devices, endotracheal tubes, cardiac valves, adhesive plasters, wound dressings, implantable devices other than the above, implantable devices other than the above, artificial skins, and artificial muscles; fishery equipment and parts thereof such as ships, ropes, fishing nets, fishing tools, floats, and buoys; in-water structures of water supply inlets and water drainage outlets at thermal power plants and nuclear power plants; sea water utilizing equipment such as sea water pumps; parts of power generation facilities, parts of port and coastal facilities such as megafloats, coastal roads, and undersea tunnels; civil engineering materials and equipment and parts thereof such as sludge diffusion preventing sheets for various marine civil engineering for canals, waterways, or the like; outdoor facilities such as bridges, traffic mirrors, signboards, traffic signs, various display devices, advertisement pillars, sound barrier walls, bridges, guard rails, and tunnels; agricultural materials and equipment such as plant pods, soils, watering tubes, piping, and greenhouses; and display devices such as televisions, smartphones, tablet personal computers, personal computers, and touch-panel displays.

[Measurements of Biofilm Adhesion Amount]

A method of measuring an amount of a biofilm adhered on a material containing the composition according to the present invention includes forming a biofilm on the material and quantitatively measuring the biofilm thus formed.

As the biofilm to be measured, biofilms existing in various environments may be sampled and used as such. Moreover, the measurement may be carried out by using a microorganism known as a biofilm former solely or a mixture of such microorganisms. Biofilms contain different kinds of microorganisms depending not only on the environments where the biofilms are formed, but also on phases and environmental conditions in which the biofilms are sampled. Therefore, even if the material is measured, results of each measurement would possibly vary. Therefore, it is preferable that evaluation of the biofilm adhesion of a material be carried out by measuring solely with a known biofilm former microorganism or with a mixture of a several kinds of known biofilm former microorganisms in view of quantitative measurability and reproducibility.

The microorganism for use in the measurement of the biofilm adhesion amount is not particularly limited, as long as the microorganism has an ability of forming a biofilm. Examples of the microorganism for use in the measurement include *Pseudomonas* bacteria, *Brevundimonas* bacteria, *Methylobacterium* bacteria, *Bacillus* bacteria, and *Staphylococcus* bacteria. Microorganisms preferably for the measurement are those that are easy to incubate, adhesive to the material in a large amount, and not peelable from the material with weak water flow in view of quantitative measurability and reproducibility. Preferable examples of microorganism with such characteristics include *Staphylococcus epidermidis* ATCC35984, and *Brevundimonas diminuta* NBRC14213.

As a method of forming a biofilm on a material, it is possible to form the biofilm on the material by placing the material at a place where the biofilm is formed and exists. Moreover, it is possible to form the biofilm on the material by immersing the material in an incubation medium by using a general incubation technique for microorganisms. For the sake of the quantitative measurability and reproducibility, it is preferable that the measurement of the biofilm adhesion amount be carried out by such a general incubation technique for microorganisms, and it is preferable that the measurement be carried out in such a way that conditions of temperature, medium, and the like are uniform and contamination with unwanted microorganisms is prevented by sterilization of the incubation containers and medium for forming the biofilm and the like measures.

Incubation conditions for forming the biofilm on the material can be set as appropriate, as long as physical conditions such as temperature, aeration, and vibration or stationary, nutrition conditions such as medium constituents, concentration, and pH, and the other conditions such as a material and a size of an incubation vessel are within such ranges that allow growth of the microorganism. A shape and size of the material on which the biofilm is to be formed may be set as appropriate, as long as the shape and size are within such ranges that allow the material to be accommodated in the incubation vessel and immersed in an incubation liquid.

The amount of the biofilm formed and adhered on the material can be measured by measuring the biofilm still on the material or by measuring the biofilm after collected from the material. Examples of a detection method for the biofilm include a method of counting the number of cells by dispersing the biofilm in water, and a method of staining the biofilm with a staining reagent. For the sake of easiness of measurement operation, quantitative measurability, and reproducibility, the method of staining the biofilm is preferable. Examples of the staining reagent for the biofilm include crystal violet, methylene blue, fuchsine, acridine orange, DAPI, and alcian blue, but for the sake of easiness of measurement operation, quantitative measurability, and reproducibility, crystal violet is preferable.

EXAMPLES

Hereinafter, the present invention will be described more concretely referring to Examples, but it should be noted that the present invention is not limited to these Examples. Measurement values of items in Descriptions, Examples, and Comparative Example were measured by the following methods.

[Contact Angle Measurement and Calculation of Surface Free Energy]

A surface free energy of the molded body can be worked out by measuring contact angles of a plurality of liquids with known surface free energies.

By using DM-501 (made by Kyowa Interface Science, Inc.), contact angles of liquids with respect to a molded body were measured by a θ/2 method. As the liquid whose contact angle with respect to the molded body is measured, pure water, hexadecane, and diiodoethane were used, and a dropping amount was 2 µl. The surface free energy of the molded body was worked out from the contact angles of the liquids with respect to the molded body by using the method proposed by Kitabata and Hata described above.

[Log S]

Log S of a quorum sensing inhibitor (B) was worked out by using a method A or a method B described below.

[Method A]

As a common logarithm log S of a solubility S (g/100 g) of the quorum sensing inhibitor (B) indicating an amount thereof soluble in 100 g of water at 25° C., a value calculated out by using computer software Hansen Solubility Parameter in Practice (HSPiP) ver 5.0.04 was used.

[Method B]

Into an eggplant flask of 100 ml, a stirrer and 100 ml of water were added and heated to 25° C. by using a hot stirrer. Under stirring by using the stirrer at 100 rpm, a quorum sensing inhibitor (B) was added. From a concentration at which insoluble residues were visibly observed 1 hour later from the addition, the common logarithm log S of the solubility S (g/100 g) of the quorum sensing inhibitor (B) indicating a soluble amount thereof in 100 g of water at 25° C. was worked out. If the insoluble residues were observed when 1 mg of the quorum sensing inhibitor (B) was added, the value of log S was worked out as log S<−3.

[Calculation of Ra]

A Hansen solubility parameter of at least one resin (A) selected from the group consisting of the thermoplastic resins and the thermosetting resins and a Hansen solubility parameter of the quorum sensing inhibitor (B) were Hansen solubility parameters represented by Equation (1') above, which is described in A User's Handbook, Second Edition, C. M. Hansen (2007), Taylor and Francis Group, LLC (HSPiP manual). A distance Ra between the Hansen solubility parameter $HSP_\alpha$ of the resin (A) and the Hansen solubility parameter $HSP_\beta$ of the quorum sensing inhibitor (B) was calculated by the following equation, where δD is the London dispersion force item, δP is the molecular polarization item, and δH was hydrogen bonding item, which are of the solubility parameters calculated out by using the computer software Hansen Solubility Parameters Practice (HSPiP) ver 5.0.04.

$$Ra=[4\times(\delta D_\alpha-\delta D_\beta)^2+(\delta P_\alpha-\delta P_\beta)^2+(\delta H_\alpha-\delta H_\beta)^2]^{1/2} \quad (2')$$

<Biofilm Adhesion Test>

[Preparation of Media and Measurement Solution]

Preculture Medium (NBRC802 Medium)

Into a medium bottle of 1000 mL capacity, 10 g of hipolypepton (made by Nihon pharmaceutical Co., Ltd.), 2 g of yeast extract (made by DIFCO Laboratories), and 1 g of $MgSO_4 \cdot 7H_2O$ (made by NACALAI TESQUE, INC.) were added. Next, 1000 mL of super pure water was added therein, and respective ingredients were dissolved. A solution thus prepared was adjusted to pH 7.0 with a NaOH solution of 1 mol/L, and then sterilized at 121° C. for 20 min in an autoclave, thereby obtaining a preculture medium.

Culture Medium (R2A Medium)

Into a medium bottle of 1000 mL capacity, 3.2 g of R2A medium (made by Nihon pharmaceutical Co., Ltd.) was added. Next, 1000 mL of super pure water was added therein, and the ingredient was dissolved. A solution thus prepared was sterilized at 121° C. for 20 min in an autoclave, thereby obtaining a culture medium.

Biofilm Staining Solution (0.2 Mass % Crystal Violet Solution: CV Solution)

Into a medium bottle of 1000 mL capacity, 2 g of crystal violet (made by NACALAI TESQUE, INC.) was added. Next, 1000 mL of super pure water was added therein, and the ingredient was dissolved, thereby obtaining a biofilm staining solution.

Stained Biofilm Eluting Solution (2.0 Mass % Sodium Dodecyl Sulfate: SDS Solution)

Into a medium bottle of 1000 mL capacity, 20 g of sodium dodecyl sulfate (made by NACALAI TESQUE, INC.) was added. Next, 1000 mL of super pure water was added therein, and the ingredient was dissolved, thereby obtaining a stained biofilm eluting solution.

[Preparation of Freeze-Stored Strain for Biofilm Adhesion Amount Measurement]

As a strain for use in measuring the biofilm adhesion amount, *Staphylococcus epidermidis* ATCC35984 (Hereinafter, referred to as microorganism A) were obtained from American Type Culture Collection (ATCC) and *Brevundimonas diminuta* NBRC14213 (hereinafter, referred to as microorganism B) was obtained from National Institute of Technology and Evaluation (NBRC), each of which was obtained in the form of freeze-dried ampoule. Into a test tube of 18 φ having been sterilized at 121° C. for 20 min in an autoclave and being equipped with a plastic cap for incubation, 3 mL of the preculture medium was dispensed. Into the test tube, a whole amount of the strain in the freeze-dried ampoule was inoculated, thereby preparing an inoculated test tube. The inoculated test tube was mounted to a vibration incubator and incubated at a temperature of 30° C. at a vibration speed of 200 times/min for 3 days, thereby obtaining an incubation solution. Into the incubation solution, glycerol was added to attain a final concentration of 30 mass %, and the incubation solution thus adjusted was dispersed into a freeze-stored tube, thereby preparing a freeze-stored strain. The freeze-stored strain thus prepared was stored in an ultra low temperature freezer of −80° C.

[Preparation of Preculture Solution]

Into a test tube of 18 φ having been sterilized at 121° C. for 20 min in an autoclave and being equipped with a plastic cap for incubation, 3 mL of the preculture medium was dispensed. Into this, 0.03 mL of the freeze-stored strain was inoculated. The inoculated test tube was mounted on the vibration incubator, and incubated at a temperature of 30° C. at a vibration speed of 200 times/min for 3 days, thereby obtaining a preculture solution.

[Preparation of Culture Solution]

Turbidity of the preculture solution at a wavelength of 660 nm was measured by using a spectrophotometer UV-1800 (made by Shimadzu Corporation; hereinafter referred to as the spectrophotometer). Into 1000 mL of the culture medium, the preculture solution of an amount that would produce a turbidity of 0.01 was inoculated and stirred, thereby preparing a culture solution.

[Preparation of Test Piece]

A sheet made from at least one resin (A) selected from the group consisting of the thermoplastic resins and the thermosetting resins and sheets made from compositions of Examples were subjected to a biofilm adhesion test as described below. As a test piece for the biofilm adhesion test, a test piece of a size 20 mm×20 mm×1 mm thickness was used. The test piece was washed with a diluted neutral detergent in order to clean a surface thereof, and sterilized by being immersed in ethanol for a few seconds in order to annihilate bacteria on the surface.

[Measurements of Biofilm Adhesion Amount]

Into a centrifuge tube of 50 mL capacity (hereinafter, which may be referred to as the centrifuge tube) made of polypropylene and having been sterilized, the sterilized test piece was placed and then 15 mL of the inoculated culture medium was dispensed. The centrifuge tube was placed in an air-jacketed incubator and incubated at 30° C. for 3 days stationarily. After that, the test piece was taken out from the centrifuge tube by using tweezers, and excess medium solution on the test piece was absorbed with paper towel. After about 50 mL of pure water was added in a 100-mL beaker, the test piece thus taken out was immersed into the pure water and gently swung therein, thereby being washed.

The test piece thus washed was taken out therefrom and excess moisture on the test piece was absorbed with paper towel.

Into a sample tube of 20 mL capacity made of polypropylene, 10 mL of the biofilm staining solution was added. The test piece thus washed was immersed into the biofilm staining solution for 30 min or longer, thereby being stained. The test piece was taken out from the biofilm staining solution, and excess biofilm staining solution on the test piece was absorbed with paper towel. After about 50 mL of pure water was added in a 100-mL beaker, the test piece thus taken out was immersed into the pure water and gently swung therein, thereby being washed. The test piece thus washed was taken out therefrom and excess moisture on the test piece was absorbed with paper towel.

Into a centrifuge tube, 15 mL of the stained biofilm eluting solution was added. The test piece thus stained was immersed in the stained biofilm eluting solution for 30 min or longer, thereby eluting the crystal violet from the test piece. An elution solution thus obtained was placed in a 1-mL spectrometer cell, and absorbance of the elution solution at a wavelength of 570 nm was measured. A greater absorbance indicates a greater biofilm adhesion amount. From absorbances of the sheets made from the compositions of Examples (hereinafter, referred to as "A (molded body)"), and the absorbances of sheets made from TPE, ABS, PP, m-PPE, cross-linked PMMA, unsaturated polyester, or polyurethane, which are described below (hereinafter, "A (TPE, ABS, PP, m-PPE, cross-linked PMMA, unsaturated polyester, or polyurethane)" included in the compositions of Examples, "biofilm reduction rates" of the compositions of Examples were worked out by using the following equation.

$$\text{(Biofilm reducing ratios (\%))} = \left(1 - \frac{A(\text{Molded body})}{A\begin{pmatrix} \text{TPE, ABS,} \\ \text{PP, m-PPE,} \\ \text{cross-linked PMMA,} \\ \text{unsaturated polyester,} \\ \text{or polyurethane} \end{pmatrix}}\right) \times 100$$

A greater "biofilm reduction rate" indicates that the biofilm adhesion amount of the sheet made from the composition was smaller, compared with the biofilm adhesion amount on the sheet made from the TPE, ABS, PP, m-PPE, cross-linked PMMA, unsaturated polyester, or the polyurethane.

Production Example 1

In an autoclave reactor, ethylene and methyl acrylate were copolymerized with tert-butyl peroxypivalate as a radical polymerization initiator at a reaction temperature of 195° C. under a reaction pressure of 160 MPa to afford ethylene-methyl acrylate copolymer.

Production Example 2

After an inside of a separable flask equipped with a stirrer and a finger baffle and having an internal capacity of 0.3 L was purged with nitrogen gas, ethylene-methyl acrylate thus produced in Production Example 1 (40.00 g) and 1H,1H, 2H,2H-tridecafluoro-1-octanol (50.44 g) (made by Tokyo Chemical Industry Co., Ltd.) were added therein and stirred for 3 hours under heating in an oil bath set to a temperature of 130° C. and reduced pressure of 10 kPa. After that, in a nitrogen gas atmosphere, tetraisopropyl orthotitanate (0.41 g) (Nippon Soda Co., Ltd.) was added therein and a mixture thus obtained was stirred for 42 hours under heating in an oil bath set to a temperature of 140° C. and reduced pressure of 10 to 1 kPa, thereby obtaining an ethylene-1H, 1H, 2H, 2H-tridecafluoro-1-octylacrylate-methylacrylate copolymer.

Example 1

As at least one resin (A) selected from the group consisting of the thermoplastic resins and the thermosetting resins, olefin-based thermoplastic elastomer (TPE, made by Sumitomo Chemical Co., Ltd., ESPOLEX TPE 4272) was used, and as a quorum sensing inhibitor (B), curcumin (made by Tokyo Chemical Industry Co., Ltd.) was used. By using Labo Plastomill (made by Toyo Seiki Seisaku-sho, Ltd., R100), 97 wt % of TPE and 3 wt % of curcumin were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 210° C., preheated for 5 min, pressed up to 10 MPa and held under the press for 5 min, and cooled at 30° C. for 5 min under 10 MPa, thereby preparing a sheet (1) of 1 mm in thickness.

log S of the quorum sensing inhibitor (B) contained in the sheet (1) and $Ra_1$ of the sheet (1) are shown on Table 1. Moreover, a surface free energy of the sheet (1) and a biofilm reduction rate of the sheet (1) calculated from A (molded body) and A (TPE) after a biofilm adhesion test with the microorganism A as an evaluation microorganism are shown on Table 3.

Example 2

A resin composition and a sheet (2) were prepared as in Example 1, except that the quorum sensing inhibitor (B) was 2,3,4-trimethoxycinnamate (made by Tokyo Chemical Industry Co., Ltd.).

log S of the quorum sensing inhibitor (B) contained in the sheet (2) and $Ra_1$ of the sheet (2) are shown on Table 1. Moreover, a surface free energy of the sheet (2) and a biofilm reduction rate of the sheet (2) calculated from A (molded body) and A (TPE) after a biofilm adhesion test with the microorganism A as an evaluation microorganism are shown on Table 3.

Example 3

A resin composition and a sheet (3) were prepared as in Example 1, except that the quorum sensing inhibitor (B) was eugenol (made by Tokyo Chemical Industry Co., Ltd.).

log S of the quorum sensing inhibitor (B) contained in the sheet (3) and $Ra_1$ of the sheet (3) are shown on Table 1. Moreover, a surface free energy of the sheet (3) and a biofilm reduction rate of the sheet (3) calculated from A (molded body) and A (TPE) after a biofilm adhesion test with the microorganism A as an evaluation microorganism are shown on Table 3.

Example 4

A resin composition and a sheet (4) were prepared as in Example 1, except that the quorum sensing inhibitor (B) was 2-fluorocinnamate (made by Tokyo Chemical Industry Co., Ltd.).

log S of the quorum sensing inhibitor (B) contained in the sheet (4) and $Ra_1$ of the sheet (4) are shown on Table 1. Moreover, a surface free energy of the sheet (4) and a biofilm reduction rate of the sheet (4) calculated from A (molded body) and A (TPE) after a biofilm adhesion test with the microorganism A as an evaluation microorganism are shown on Table 3.

Example 5

A resin composition and a sheet (5) were prepared as in Example 1, except that the quorum sensing inhibitor (B) was flavone (made by Tokyo Chemical Industry Co., Ltd.).

log S of the quorum sensing inhibitor (B) contained in the sheet (5) and $Ra_1$ of the sheet (5) are shown on Table 1. Moreover, a surface free energy of the sheet (5) and a biofilm reduction rate of the sheet (5) calculated from A (molded body) and A (TPE) after a biofilm adhesion test with the microorganism A as an evaluation microorganism are shown on Table 3.

Example 6

A resin composition and a sheet (6) were prepared as in Example 1, except that the quorum sensing inhibitor (B) was 3-Fluoro-4-methylphenylboronic acid (made by Tokyo Chemical Industry Co., Ltd.).

log S of the quorum sensing inhibitor (B) contained in the sheet (6) and $Ra_1$ of the sheet (6) are shown on Table 1. Moreover, a surface free energy of the sheet (6) and a biofilm reduction rate of the sheet (6) calculated from A (molded body) and A (TPE) after a biofilm adhesion test with the microorganism A as an evaluation microorganism are shown on Table 4.

Example 7

A resin composition and a sheet (7) were prepared as in Example 1, except that the quorum sensing inhibitor (B) was salicylic acid (made by Tokyo Chemical Industry Co., Ltd.).

log S of the quorum sensing inhibitor (B) contained in the sheet (7) and $Ra_1$ of the sheet (7) are shown on Table 1. Moreover, a surface free energy of the sheet (7) and a biofilm reduction rate of the sheet (7) calculated from A (molded body) and A (TPE) after a biofilm adhesion test with the microorganism A as an evaluation microorganism are shown on Table 4.

Example 8

A resin composition and a sheet (8) were prepared as in Example 1, except that the quorum sensing inhibitor (B) was thymol (made by Tokyo Chemical Industry Co., Ltd.).

log S of the quorum sensing inhibitor (B) contained in the sheet (8) and $Ra_1$ of the sheet (8) are shown on Table 1. Moreover, a surface free energy of the sheet (8) and a biofilm reduction rate of the sheet (8) calculated from A (molded body) and A (TPE) after a biofilm adhesion test with the microorganism A as an evaluation microorganism are shown on Table 4.

Example 9

A resin composition and a sheet (9) were prepared as in Example 1, except that the quorum sensing inhibitor (B) was phytol (made by Tokyo Chemical Industry Co., Ltd.).

log S of the quorum sensing inhibitor (B) contained in the sheet (9) and $Ra_1$ of the sheet (9) are shown on Table 1. Moreover, a surface free energy of the sheet (9) and a biofilm reduction rate of the sheet (9) calculated from A (molded body) and A (TPE) after a biofilm adhesion test with the microorganism A as an evaluation microorganism are shown on Table 4.

Example 10

A resin composition and a sheet (10) were prepared as in Example 2, except that a content of TPE was changed to 99.5 wt % and a content of 2,3,4-trimethoxycinnamate was changed to 0.5 wt %.

log S of the quorum sensing inhibitor (B) contained in the sheet (10) and $Ra_1$ of the sheet (10) are shown on Table 1. Moreover, a surface free energy of the sheet (10) and a biofilm reduction rate of the sheet (10) calculated from A (molded body) and A (TPE) after a biofilm adhesion test with the microorganism A as an evaluation microorganism are shown on Table 5.

Example 11

The at least one resin (A) selected from the group consisting of thermoplastic resins and thermosetting resins was TPE, the quorum sensing inhibitor (B) was 2,3,4-trimethoxycinnamate, and an antimicrobial/antifungal agent (C) was thiabendazole. By using Labo Plastomill, 99 wt % of TPE, 0.5 wt % of 2,3,4-trimethoxycinnamate, and 0.5 wt % of thiabendazole were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 210° C., preheated for 5 min, pressed up to 10 MPa and held under the press for 5 min, and cooled at 30° C. for 5 min under 10 MPa, thereby preparing a sheet (11) of 1 mm in thickness.

log S of the antimicrobial/antifungal agent (C) contained in the sheet (11) was −2.1. Moreover, a surface free energy of the sheet (11) and a biofilm reduction rate of the sheet (11) calculated from A (molded body) and A (TPE) after a biofilm adhesion test with the microorganism A as an evaluation microorganism are shown on Table 5.

Example 12

The at least one resin (A) selected from the group consisting of thermoplastic resins and thermosetting resins was a mixture of TPE and the ethylene-1H,1H,2H,2H-tridecafluoro-1-octylacrylate-methylacrylate copolymer obtained in Production Example 2, and the quorum sensing inhibitor (B) was 2,3,4-trimethoxycinnamate. By using Labo Plastomill, 96.5 wt % of TPE, 3 wt % of the ethylene-1H, 1H, 2H, 2H-tridecafluoro-1-octylacrylate-methylacrylate copolymer, and 0.5 wt % of 2,3,4-trimethoxycinnamate were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 210° C., preheated for 5 min, pressed up to 10 MPa and held under the press for 5 min, and cooled at 30° C. for 5 min under 10 MPa, thereby preparing a sheet (12) of 1 mm in thickness.

A surface free energy of the sheet (12) and a biofilm reduction rate of the sheet (12) calculated from A (molded body) and A (TPE) after a biofilm adhesion test with the microorganism A as an evaluation microorganism are shown on Table 5.

Example 13

The at least one resin (A) selected from the group consisting of thermoplastic resins and thermosetting resins was a mixture of TPE and the ethylene-1H,1H,2H,2H-tridecafluoro-1-octylacrylate-methylacrylate copolymer obtained in Production Example 2, the quorum sensing inhibitor (B) was 2,3,4-trimethoxycinnamate, and the antimicrobial/antifungal agent (C) was thiabendazole. By using Labo Plastomill, 96 wt % of TPE, 3 wt % of the ethylene-1H, 1H, 2H, 2H-tridecafluoro-1-octylacrylate-methylacrylate copolymer, 0.5 wt % of 2,3,4-trimethoxycinnamate, and 0.5 wt % of the thiabendazole were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 210° C., preheated for 5 min, pressed up to 10 MPa and held under the press for 5 min, and cooled at 30° C. for 5 min under 10 MPa, thereby preparing a sheet (13) of 1 mm in thickness.

A surface free energy of the sheet (13) and a biofilm reduction rate of the sheet (13) calculated from A (molded body) and A (TPE) after a biofilm adhesion test with the microorganism A as an evaluation microorganism are shown on Table 5.

Example 14

The at least one resin (A) selected from the group consisting of thermoplastic resins and thermosetting resins was an acrylonitrile-butadiene-styrene copolymer (ABS, made by NIPPON A&L INC., Klarastic MTK), and the quorum sensing inhibitor (B) was purpurin (made by Sigma-Aldrich Co. LLC.). By using Labo Plastomill, 97 wt % of the acrylonitrile-butadiene-styrene copolymer, 3 wt % of purpurin were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 220° C., preheated for 5 min, pressed up to 10 MPa and held under the press for 5 min, and cooled at 30° C. for 5 min under 10 MPa, thereby preparing a sheet (14) of 1 mm in thickness.

log S of the quorum sensing inhibitor (B) contained in the sheet (14) and $Ra_1$ of the sheet (14) are shown on Table 2. Moreover, a surface free energy of the sheet (14) and a biofilm reduction rate of the sheet (14) calculated from A (molded body) and A (ABS) after a biofilm adhesion test with the microorganism A as an evaluation microorganism are shown on Table 6.

Example 15

A resin composition and a sheet (15) were prepared as in Example 14, except that the quorum sensing inhibitor (B) was reserpine (made by Sigma-Aldrich Co. LLC.).

log S of the quorum sensing inhibitor (B) contained in the sheet (15) and $Ra_1$ of the sheet (15) are shown on Table 2. Moreover, a surface free energy of the sheet (15) and a biofilm reduction rate of the sheet (15) calculated from A (molded body) and A (ABS) after a biofilm adhesion test with the microorganism A as an evaluation microorganism are shown on Table 6.

Example 16

A resin composition and a sheet (16) were prepared as in Example 14, except that the quorum sensing inhibitor (B) was curcumin.

log S of the quorum sensing inhibitor (B) contained in the sheet (16) and $Ra_1$ of the sheet (16) are shown on Table 2. Moreover, a surface free energy of the sheet (16) and a biofilm reduction rate of the sheet (16) calculated from A (molded body) and A (ABS) after a biofilm adhesion test with the microorganism A as an evaluation microorganism are shown on Table 6.

Example 17

The at least one resin (A) selected from the group consisting of thermoplastic resins and thermosetting resins was an acrylonitrile-butadiene-styrene copolymer, the quorum sensing inhibitor (B) was purpurin, and the antimicrobial/antifungal agent (C) was thiabendazole. By using Labo Plastomill, 94 wt % of the acrylonitrile-butadiene-styrene copolymer, 3 wt % of purpurin, and 3 wt % of thiabendazole were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 220° C., preheated for 5 min, pressed up to 10 MPa and held under the press for 5 min, and cooled at 30° C. for 5 min under 10 MPa, thereby preparing a sheet (17) of 1 mm in thickness.

log S of the antimicrobial/antifungal agent (C) contained in the sheet (17) was −2.1. Moreover, a surface free energy of the sheet (17) and a biofilm reduction rate of the sheet (17) calculated from A (molded body) and A (ABS) after a biofilm adhesion test with the microorganism A as an evaluation microorganism are shown on Table 7.

Example 18

The at least one resin (A) selected from the group consisting of thermoplastic resins and thermosetting resins was a mixture of the acrylonitrile-butadiene-styrene copolymer and the ethylene-1H, 1H, 2H, 2H-tridecafluoro-1-octylacrylate-methylacrylate copolymer obtained in Production Example 2, and the quorum sensing inhibitor (B) was purpurin. By using Labo Plastomill, 92 wt % of the acrylonitrile-butadiene-styrene copolymer, 5 wt % of the ethylene-1H,1H,2H,2H-tridecafluoro-1-octylacrylate-methylacrylate copolymer, and 3 wt % of purpurin were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 220° C., preheated for 5 min, pressed up to 10 MPa and held under the press for 5 min, and cooled at 30° C. for 5 min under 10 MPa, thereby preparing a sheet (18) of 1 mm in thickness.

A surface free energy of the sheet (18) and a biofilm reduction rate of the sheet (18) calculated from A (molded body) and A (ABS) after a biofilm adhesion test with the microorganism A as an evaluation microorganism are shown on Table 7.

Example 19

The at least one resin (A) selected from the group consisting of thermoplastic resins and thermosetting resins was a mixture of the acrylonitrile-butadiene-styrene copolymer and the ethylene-1H, 1H, 2H, 2H-tridecafluoro-1-octylacrylate-methylacrylate copolymer obtained in Production Example 2, the quorum sensing inhibitor (B) was purpurin, and the antimicrobial/antifungal agent (C) was thiabendazole. By using Labo Plastomill, 89 wt % of the acrylonitrile-butadiene-styrene copolymer, 5 wt % of the ethylene-1H, 1H, 2H, 2H-tridecafluoro-1-octylacrylate-methylacrylate copolymer, 3 wt % of purpurin, and 3 wt % of thiabendazole were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 220° C., preheated for 5 min, pressed up to 10 MPa and held under the press for 5 min, and cooled at 30° C. for 5 min under 10 MPa, thereby preparing a sheet (19) of 1 mm in thickness.

A surface free energy of the sheet (19) and a biofilm reduction rate of the sheet (19) calculated from A (molded body) and A (ABS) after a biofilm adhesion test with the microorganism A as an evaluation microorganism are shown on Table 7.

Example 20

The at least one resin (A) selected from the group consisting of thermoplastic resins and thermosetting resins was the TPE, and the quorum sensing inhibitor (B) was umbelliferone (made by Tokyo Chemical Industry Co., Ltd.). By using Labo Plastomill, 99 wt % of TPE and 1 wt % of curcumin were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 210° C., preheated for 5 min, pressed up to 10 MPa and held under the press for 5 min, and cooled at 30° C. for 5 min under 10 MPa, thereby preparing a sheet (27) of 1 mm in thickness.

log S of the quorum sensing inhibitor (B) contained in the sheet (27) and $Ra_1$ of the sheet (27) are shown on Table 1. Moreover, a surface free energy of the sheet (27) and a biofilm reduction rate of the sheet (27) calculated from A (molded body) and A (TPE) after a biofilm adhesion test with the microorganism A as an evaluation microorganism are shown on Table 11.

Example 21

A resin composition and a sheet (28) were prepared as in Example 20, except that the quorum sensing inhibitor (B) was (−)-epicatechin (made by Tokyo Chemical Industry Co., Ltd.).

log S of the quorum sensing inhibitor (B) contained in the sheet (28) and $Ra_1$ of the sheet (28) are shown on Table 1. Moreover, a surface free energy of the sheet (28) and a biofilm reduction rate of the sheet (28) calculated from A (molded body) and A (TPE) after a biofilm adhesion test with the microorganism A as an evaluation microorganism are shown on Table 11.

Example 22

A resin composition and a sheet (29) were prepared as in Example 20, except that the quorum sensing inhibitor (B) was Carvacrol (made by Tokyo Chemical Industry Co., Ltd.).

log S of the quorum sensing inhibitor (B) contained in the sheet (29) and $Ra_1$ of the sheet (29) are shown on Table 1. Moreover, a surface free energy of the sheet (29) and a biofilm reduction rate of the sheet (29) calculated from A (molded body) and A (TPE) after a biofilm adhesion test with the microorganism A as an evaluation microorganism are shown on Table 11.

Example 23

A resin composition and a sheet (30) were prepared as in Example 20, except that the quorum sensing inhibitor (B) was tannic acid (made by Wako Pure Chemical Corporation).

log S of the quorum sensing inhibitor (B) contained in the sheet (30) and $Ra_1$ of the sheet (30) are shown on Table 1. Moreover, a surface free energy of the sheet (30) and a biofilm reduction rate of the sheet (30) calculated from A (molded body) and A (TPE) after a biofilm adhesion test with the microorganism A as an evaluation microorganism are shown on Table 11.

Example 24

A resin composition and a sheet (31) were prepared as in Example 20, except that the quorum sensing inhibitor (B) was indole (made by Tokyo Chemical Industry Co., Ltd.).

log S of the quorum sensing inhibitor (B) contained in the sheet (31) and Ra$_1$ of the sheet (31) are shown on Table 1. Moreover, a surface free energy of the sheet (31) and a biofilm reduction rate of the sheet (31) calculated from A (molded body) and A (TPE) after a biofilm adhesion test with the microorganism A as an evaluation microorganism are shown on Table 11.

Example 25

A resin composition and a sheet (32) were prepared as in Example 20, except that the quorum sensing inhibitor (B) was resveratrol (made by Tokyo Chemical Industry Co., Ltd.).

log S of the quorum sensing inhibitor (B) contained in the sheet (32) and Ra$_1$ of the sheet (32) are shown on Table 1. Moreover, a surface free energy of the sheet (32) and a biofilm reduction rate of the sheet (32) calculated from A (molded body) and A (TPE) after a biofilm adhesion test with the microorganism A as an evaluation microorganism are shown on Table 12.

Example 26

A composition and a sheet (33) were prepared as in Example 20, except that the quorum sensing inhibitor (B) was diphenyl disulfide (made by Tokyo Chemical Industry Co., Ltd.).

log S of the quorum sensing inhibitor (B) contained in the sheet (33) and Ra$_1$ of the sheet (33) are shown on Table 1. Moreover, a surface free energy of the sheet (33) and a biofilm reduction rate of the sheet (33) calculated from A (molded body) and A (TPE) after a biofilm adhesion test with the microorganism A as an evaluation microorganism are shown on Table 12.

Example 27

A composition and a sheet (34) were prepared as in Example 20, except that the quorum sensing inhibitor (B) was N-(3-oxododecanoyl)-L-homoserine lactone (made by Sigma-Aldrich Co. LLC.).

log S of the quorum sensing inhibitor (B) contained in the sheet (34) and Ra$_1$ of the sheet (34) are shown on Table 1. Moreover, a surface free energy of the sheet (34) and a biofilm reduction rate of the sheet (34) calculated from A (molded body) and A (TPE) after a biofilm adhesion test with the microorganism A as an evaluation microorganism are shown on Table 13.

Example 28

The at least one resin (A) selected from the group consisting of thermoplastic resins and thermosetting resins was polypropylene (PP, made by Sumitomo Chemical Co., Ltd., NOBLEN FLX-80E4), and the quorum sensing inhibitor (B) was curcumin. By using Labo Plastomill, and 99.5 wt % of polypropylene and 0.5 wt % of curcumin were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 220° C., preheated for 5 min, pressed up to 10 MPa and held under the press for 5 min, and cooled at 30° C. for 5 min under 10 MPa, thereby preparing a sheet (35) of 1 mm in thickness.

log S of the quorum sensing inhibitor (B) contained in the sheet (35) and Ra$_1$ of the sheet (35) are shown on Table 8. Moreover, a surface free energy of the sheet (35) and a biofilm reduction rate of the sheet (35) calculated from A (molded body) and A (PP) after a biofilm adhesion test with the microorganism A as an evaluation microorganism are shown on Table 13.

Example 29

A resin composition and a sheet (36) were prepared as in Example 28, except that the quorum sensing inhibitor (B) was 2,3,4-trimethoxycinnamate (made by Tokyo Chemical Industry Co., Ltd.).

log S of the quorum sensing inhibitor (B) contained in the sheet (36) and Ra$_1$ of the sheet (36) are shown on Table 8. Moreover, a surface free energy of the sheet (36) and a biofilm reduction rate of the sheet (36) calculated from A (molded body) and A (PP) after a biofilm adhesion test with the microorganism A as an evaluation microorganism are shown on Table 13.

Example 30

The at least one resin (A) selected from the group consisting of thermoplastic resins and thermosetting resins was modified polyphenylene ether (m-PPE, made by Mitsubishi Engineering-Plastics Corporation, Lupiace AH-40), and the quorum sensing inhibitor (B) was phytol. By using Labo Plastomill, 99 wt % of modified polyphenylene ether and 1 wt % of phytol were melted and kneaded at 240° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 260° C., preheated for 5 min, pressed up to 10 MPa and held under the press for 5 min, and cooled at 30° C. for 5 min under 10 MPa, thereby preparing a sheet (37) of 1 mm in thickness.

log S of the quorum sensing inhibitor (B) contained in the sheet (37) and Ra$_1$ of the sheet (37) are shown on Table 8. Moreover, a surface free energy of the sheet (37) and a biofilm reduction rate of the sheet (37) calculated from A (molded body) and A (m-PPE) after a biofilm adhesion test with the microorganism A as an evaluation microorganism are shown on Table 13.

Example 31

A biofilm reduction rate calculated from A (molded body) and A (TPE) after a biofilm adhesion test with a microorganism B as an evaluation microorganism for the sheet (27) is shown on Table 14.

Example 32

A resin composition and a sheet (38) were prepared as in Example 20, except that the quorum sensing inhibitor (B) was phytol (made by Tokyo Chemical Industry Co., Ltd.).

log S of the quorum sensing inhibitor (B) contained in the sheet (38) and $Ra_1$ of the sheet (38) are shown on Table 1. Moreover, a surface free energy of the sheet (38) and a biofilm reduction rate of the sheet (38) calculated from A (molded body) and A (TPE) after a biofilm adhesion test with the microorganism B as an evaluation microorganism are shown on Table 14.

Example 33

A biofilm reduction rate calculated from A (molded body) and A (TPE) after a biofilm adhesion test with a microorganism B as an evaluation microorganism for the sheet (29) is shown on Table 14.

Example 34

A biofilm reduction rate calculated from A (molded body) and A (TPE) after a biofilm adhesion test with a microorganism B as an evaluation microorganism for the sheet (30) is shown on Table 14.

Example 35

The at least one resin (A) selected from the group consisting of thermoplastic resins and thermosetting resins was TPE, the quorum sensing inhibitor (B) was phytol, and an antimicrobial/antifungal agent (C) was FK-C. By using Labo Plastomill, 99 wt % of TPE, 0.5 wt % of phytol, and 0.5 wt % of FK-C were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 210° C., preheated for 5 min, pressed up to 10 MPa and held under the press for 5 min, and cooled at 30° C. for 5 min under 10 MPa, thereby preparing a sheet (39) of 1 mm in thickness.

A surface free energy of the sheet (39) and a biofilm reduction rate of the sheet (39) calculated from A (molded body) and A (TPE) after a biofilm adhesion test with the microorganism B as an evaluation microorganism are shown on Table 15.

Example 36

The at least one resin (A) selected from the group consisting of thermoplastic resins and thermosetting resins was a mixture of TPE and the ethylene-1H,1H,2H,2H-tridecafluoro-1-octylacrylate-methylacrylate copolymer obtained in Production Example 2, and the quorum sensing inhibitor (B) was phytol. By using Labo Plastomill, 96.5 wt % of TPE, 3 wt % of the ethylene-1H,1H,2H,2H-tridecafluoro-1-octylacrylate-methylacrylate copolymer, and 0.5 wt % of phytol were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 210° C., preheated for 5 min, pressed up to 10 MPa and held under the press for 5 min, and cooled at 30° C. for 5 min under 10 MPa, thereby preparing a sheet (40) of 1 mm in thickness.

A surface free energy of the sheet (40) and a biofilm reduction rate of the sheet (40) calculated from A (molded body) and A (TPE) after a biofilm adhesion test with the microorganism B as an evaluation microorganism are shown on Table 15.

Example 37

The at least one resin (A) selected from the group consisting of thermoplastic resins and thermosetting resins was a mixture of TPE and the ethylene-1H,1H,2H,2H-tridecafluoro-1-octylacrylate-methylacrylate copolymer obtained in Production Example 2, the quorum sensing inhibitor (B) was phytol, and the antimicrobial/antifungal agent (C) was FK-C. By using Labo Plastomill, 96 wt % of TPE, 3 wt % of the ethylene-1H,1H,2H,2H-tridecafluoro-1-octylacrylate-methylacrylate copolymer, 0.5 wt % of phytol, and 0.5 wt % of the FK-C were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 210° C., preheated for 5 min, pressed up to 10 MPa and held under the press for 5 min, and cooled at 30° C. for 5 min under 10 MPa, thereby preparing a sheet (41) of 1 mm in thickness.

A surface free energy of the sheet (41) and a biofilm reduction rate of the sheet (41) calculated from A (molded body) and A (TPE) after a biofilm adhesion test with the microorganism B as an evaluation microorganism are shown on Table 15.

Example 38

The at least one resin (A) selected from the group consisting of thermoplastic resins and thermosetting resins was cross-linked PMMA, the quorum sensing inhibitor (B) was berberine chloride hydrate (made by Tokyo Chemical Industry Co., Ltd.). Into a vessel made from glass, 93.8 parts by mass of methyl methacrylate (hereinafter, referred to as MMA, made by Sumitomo Chemical Co., Ltd.), 1 part by mass of ethylene glycol dimethacrylate (hereinafter, referred to as 1G, made by Shin-Nakamura Chemical Co. Ltd.), 0.08 parts by mass of sodium di-(2-ethylhexyl)sulfosuccinate (made by Sanyo Chemical Industries, Ltd.), 0.01 parts by mass of terpinolene (made by Yasuhara Chemical Co., Ltd.), 0.08 parts by mass of 2,2'-azobis isobutyronitrile (made by Otsuka Chemical Co., Ltd.), and 5 parts by mass of berberine chloride hydrate were added and stirred for 15 min by using a magnetic stirrer, thereby preparing a solution. The solution thus prepared was injected into a cell formed by sandwiching a gasket made of vinyl chloride resin of 2.5 mm in thickness with two glass plates, and placed in an oven in such a way that one of the glass plates was on a lower side in the vertical direction and the other glass plate was on an upper side in the vertical direction, and stood still at a room temperature for 30 min. After that, the cell was heated according to a heating condition as below, thereby to polymerize methyl methacrylate and ethylene glycol dimethacrylate, thereby preparing cross-linked methacrylic sheet (42) of 2 mm in thickness.

[Heating Condition]
Step 1: heating from 25° C. to 55° C. over 22 min
Step 2: keeping at 55° C. for 720 min
Step 3: heating from 55° C. to 115° C. over 40 min
Step 4: keeping at 115° C. for 120 min
Step 5: cooling from 115° C. to 25° C. over 75 min log S of the quorum sensing inhibitor (B) contained in the sheet (42) and $Ra_1$ of the sheet (42) are shown on Table 9. Moreover, a surface free energy of the sheet (42) and a biofilm reduction rate of the sheet (42) calculated from A (molded body) and A (cross-linked PMMA) after a biofilm adhesion test with the microorganism A as an evaluation microorganism are shown on Table 16. Note that the side of the sheet (42) which was the lower side in the vertical direction in forming the sheet (42) was evaluated.

Example 39

The at least one resin (A) selected from the group consisting of thermoplastic resins and thermosetting resins was cross-linked PMMA, the quorum sensing inhibitor (B) was berberine chloride hydrate, and the antimicrobial/antifungal agent (C) was 2-n-octyl-4-isothiazolin-3-one (OIT, made by Tokyo Chemical Industry Co., Ltd.). Into a vessel made from glass, 90.8 parts by mass of methyl methacrylate, 1 part by mass of ethylene glycol dimethacrylate, 0.08 parts by mass of sodium di-(2-ethylhexyl)sulfosuccinate, 0.01 parts by mass of terpinolene, 0.08 parts by mass of 2,2'-azobis isobutyronitrile, 5 parts by mass of berberine chloride hydrate, and 3 parts by mass of OIT were added and stirred for 15 min by using a magnetic stirrer, thereby preparing a solution. The solution thus prepared was injected into a cell formed by sandwiching a gasket made of vinyl chloride resin of 2.5 mm in thickness with two glass plates, and placed in an oven in such a way that one of the glass plates was on a lower side in the vertical direction and the other glass plate was on an upper side in the vertical direction, and stood still at a room temperature for 30 min. After that, the cell was heated according to a heating condition as in Example 38, thereby to polymerize methyl methacrylate and ethylene glycol dimethacrylate, thereby preparing cross-linked methacrylic sheet (43) of 2 mm in thickness.

log S of the quorum sensing inhibitor (B) contained in the sheet (43) and $Ra_1$ of the sheet (43) are shown on Table 9. Moreover, a surface free energy of the sheet (43) and a biofilm reduction rate of the sheet (43) calculated from A (molded body) and A (cross-linked PMMA) after a biofilm adhesion test with the microorganism A as an evaluation microorganism are shown on Table 16. Note that the side of the sheet (43) which was the lower side in the vertical direction in forming the sheet (43) was regarded as evaluation.

Example 40

The at least one resin (A) selected from the group consisting of thermoplastic resins and thermosetting resins was cross-linked PMMA, the quorum sensing inhibitor (B) was berberine chloride hydrate, and the surface modifier (D) was 1H,1H,2H,2H-heptadecafluorodecyl acrylate (made by Tokyo Chemical Industry Co., Ltd.). Into a vessel made from glass, 83.8 parts by mass of methyl methacrylate, 1 part by mass of ethylene glycol dimethacrylate, 0.08 parts by mass of sodium di-(2-ethylhexyl)sulfosuccinate, 0.01 parts by mass of terpinolene, 0.08 parts by mass of 2,2'-azobis isobutyronitrile, 5 parts by mass of berberine chloride hydrate, and 10 parts by mass of 1H,1H,2H,2H-heptadecafluorodecyl acrylate were added and stirred for 15 min by using a magnetic stirrer, thereby preparing a solution. The solution thus prepared was injected into a cell formed by sandwiching a gasket made of vinyl chloride resin of 2.5 mm in thickness with two glass plates, and placed in an oven in such a way that one of the glass plates was on a lower side in the vertical direction and the other glass plate was on an upper side in the vertical direction, and stood still at a room temperature for 30 min. After that, the cell was heated according to a heating condition as in Example 38, thereby to polymerize methyl methacrylate and ethylene glycol dimethacrylate and 1H,1H,2H,2H-heptadecafluorodecyl acrylate, thereby preparing cross-linked methacrylic sheet (44) of 2 mm in thickness.

log S of the quorum sensing inhibitor (B) contained in the sheet (44) and $Ra_1$ of the sheet (44) are shown on Table 9. Moreover, a surface free energy of the sheet (44) and a biofilm reduction rate of the sheet (44) calculated from A (molded body) and A (cross-linked PMMA) after a biofilm adhesion test with the microorganism A as an evaluation microorganism are shown on Table 16. Note that the side of the sheet (44) which was the lower side in the vertical direction in forming the sheet (44) was regarded as evaluation.

Example 41

The at least one resin (A) selected from the group consisting of thermoplastic resins and thermosetting resins was cross-linked PMMA, the quorum sensing inhibitor (B) was berberine chloride hydrate, the antimicrobial/antifungal agent (C) was OIT, and the surface modifier (D) was 1H,1H,2H,2H-heptadecafluorodecyl acrylate. Into a vessel made from glass, 80.8 parts by mass of methyl methacrylate, 1 part by mass of ethylene glycol dimethacrylate, 0.08 parts by mass of sodium di-(2-ethylhexyl)sulfosuccinate, 0.01 parts by mass of terpinolene, 0.08 parts by mass of 2,2'-azobis isobutyronitrile, 5 parts by mass of berberine chloride hydrate, 3 parts by mass of OIT, and 10 parts by mass of 1H,1H,2H,2H-heptadecafluorodecyl acrylate were added and stirred for 15 min by using a magnetic stirrer, thereby preparing a solution. The solution thus prepared was injected into a cell formed by sandwiching a gasket made of vinyl chloride resin of 2.5 mm in thickness with two glass plates, and placed in an oven in such a way that one of the glass plates was on a lower side in the vertical direction and the other glass plate was on an upper side in the vertical direction, and stood still at a room temperature for 30 min. After that, the cell was heated according to a heating condition as in Example 38, thereby to polymerize methyl methacrylate and ethylene glycol dimethacrylate and 1H,1H,2H,2H-heptadecafluorodecyl acrylate, thereby preparing cross-linked methacrylic sheet (45) of 2 mm in thickness.

log S of the quorum sensing inhibitor (B) contained in the sheet (45) and $Ra_1$ of the sheet (45) are shown on Table 9. Moreover, a surface free energy of the sheet (45) and a biofilm reduction rate of the sheet (45) calculated from A (molded body) and A (cross-linked PMMA) after a biofilm adhesion test with the microorganism A as an evaluation microorganism are shown on Table 16. Note that the side of the sheet (45) which was the lower side in the vertical direction in forming the sheet (45) was evaluated.

Example 42

The at least one resin (A) selected from the group consisting of thermoplastic resins and thermosetting resins was unsaturated polyester, the quorum sensing inhibitor (B) was berberine chloride hydrate. Into a vessel made of glass, 94 parts by mass of U-Pica 2035P (a mixture of an unsaturated polyester resin and styrene, U-Pica Company Ltd.) as a prepolymer, 5 parts by mass of berberine chloride hydrate, and 1 part by mass of methyl ethyl ketone peroxide (made by Tokyo Chemical Industry Co., Ltd.) as a curing agent were added, and stirred for 1 min by using a mechanical stirrer, thereby preparing a solution. The solution thus prepared was injected into a cell formed by sandwiching a frame sized of 150 mm height×150 mm width×2 mm thickness and made of ethylene-methyl methacrylate copolymer (internal size: 140 mm height×140 mm width×2 mm thickness) between two glass plates sized of 200 mm height×200 mm width×5 mm thickness, and placed in an oven in such a way that one of the glass plates was on a lower side in the vertical direction and the other glass plate was on an upper side in the vertical direction, and stood still at a room temperature for 30 min. After that, the cell was heated at 100° C. for 2 hours, thereby to polymerize unsaturated polyester and styrene, thereby preparing unsaturated polyester sheet (46) of 2 mm in thickness.

log S of the quorum sensing inhibitor (B) contained in the sheet (46) and $Ra_1$ of the sheet (46) are shown on Table 10. Moreover, a surface free energy of the sheet (46) and a biofilm reduction rate of the sheet (46) calculated from A (molded body) and A (unsaturated polyester) after a biofilm adhesion test with the microorganism A as an evaluation microorganism are shown on Table 17. Note that the side of the sheet (46) which was the lower side in the vertical direction in forming the sheet (46) was regarded as evaluation.

Example 43

The at least one resin (A) selected from the group consisting of thermoplastic resins and thermosetting resins was polyurethane, and the quorum sensing inhibitor (B) was 3-fluoro-4-methylphenylboronic acid (made by Tokyo Chemical Industry Co., Ltd.). Into a disposable cup of 10 ml, 94 parts by mass of PANDEX GW-1340 (made by DIC corporation) as a urethane prepolymer, and 5 parts by mass of 3-fluoro-4-methylphenylboronic acid were added, and stirred for 5 min by using a mechanical stirrer. Next, as a curing agent, 7 parts by mass of PANDEX HX-403 (made by DIC corporation) was added therein, and a mixture thus obtained was stirred for 3 min by using the mechanical stirrer, thereby preparing a solution. The cup with the solution thus prepared therein was set on a planetary centrifugal mixer (Awatori-Rentaro AR-100, made by THINKY CORPORATION), and the solution was defoamed by being stirred for 3 min and defoamed for 6 min. The solution was injected into a cell formed by sandwiching a frame sized of 150 mm height×150 mm width×2 mm thickness and made of ethylene-methyl methacrylate copolymer (internal size: 140 mm height×140 mm width×2 mm thickness) between two glass plates sized of 200 mm height×200 mm width×5 mm thickness, and placed in an oven in such a way that one of the glass plates was on a lower side in the vertical direction and the other glass plate was on an upper side in the vertical direction, and stood still at a room temperature for 30 min. After that, the cell was heated at 100° C. for 16 hours thereby to polymerize urethane prepolymer, thereby preparing a polyurethane sheet (47) of 2 mm in thickness.

log S of the quorum sensing inhibitor (B) contained in the sheet (47) and $Ra_1$ of the sheet (47) are shown on Table 10. Moreover, a surface free energy of the sheet (47) and a biofilm reduction rate of the sheet (47) calculated from A (molded body) and A (polyurethane) after a biofilm adhesion test with the microorganism A as an evaluation microorganism are shown on Table 17. Note that the side of the sheet (47) which was the lower side in the vertical direction in forming the sheet (47) was regarded as evaluation.

Example 44

A resin composition and a sheet (48) were prepared as in Example 38, except that the quorum sensing inhibitor (B) was 2-fluoro-4-(trifluoromethyl)phenylboronic acid (made by Tokyo Chemical Industry Co., Ltd.).

log S of the quorum sensing inhibitor (B) contained in the sheet (48) and $Ra_1$ of the sheet (48) are shown on Table 9. Moreover, a surface free energy of the sheet (48) and a biofilm reduction rate of the sheet (48) calculated from A (molded body) and A (cross-linked PMMA) after a biofilm adhesion test with the microorganism A as an evaluation microorganism are shown on Table 17.

Example 45

A resin composition and a sheet (49) were prepared as in Example 38, except that the quorum sensing inhibitor (B) was indole (made by Tokyo Chemical Industry Co., Ltd.).

log S of the quorum sensing inhibitor (B) contained in the sheet (49) and $Ra_1$ of the sheet (49) are shown on Table 9. Moreover, a surface free energy of the sheet (49) and a biofilm reduction rate of the sheet (49) calculated from A (molded body) and A (cross-linked PMMA) after a biofilm adhesion test with the microorganism A as an evaluation microorganism are shown on Table 17.

Example 46

A resin composition and a sheet (50) were prepared as in Example 38, except that the quorum sensing inhibitor (B) was flavanone (made by Tokyo Chemical Industry Co., Ltd.).

log S of the quorum sensing inhibitor (B) contained in the sheet (50) and $Ra_1$ of the sheet (50) are shown on Table 9. Moreover, a surface free energy of the sheet (50) and a biofilm reduction rate of the sheet (50) calculated from A (molded body) and A (cross-linked PMMA) after a biofilm adhesion test with the microorganism A as an evaluation microorganism are shown on Table 17.

Comparative Example 1

A resin composition and a sheet (21) were prepared as in Example 1, except that the quorum sensing inhibitor (B) was tyrosol (made by Tokyo Chemical Industry Co., Ltd.).

log S of the quorum sensing inhibitor (B) contained in the sheet (21) and $Ra_1$ of the sheet (21) are shown on Table 1. Moreover, a surface free energy of the sheet (21) and a biofilm reduction rate of the sheet (21) calculated from A (molded body) and A (TPE) after a biofilm adhesion test with the microorganism A as an evaluation microorganism are shown on Table 18.

Comparative Example 2

A resin composition and a sheet (22) were prepared as in Example 14, except that the quorum sensing inhibitor (B) was tyrosol (made by Tokyo Chemical Industry Co., Ltd.).

log S of the quorum sensing inhibitor (B) contained in the sheet (22) and the absolute value of $Ra_1$ of the sheet (22) are shown on Table 2. Moreover, a surface free energy of the sheet (22) and a biofilm reduction rate of the sheet (22) calculated from A (molded body) and A (ABS) after a biofilm adhesion test with the microorganism A as an evaluation microorganism are shown on Table 18.

Comparative Example 3

A resin composition and a sheet (23) were prepared as in Example 14, except that the quorum sensing inhibitor (B) was thymol (made by Tokyo Chemical Industry Co., Ltd.).

log S of the quorum sensing inhibitor (B) contained in the sheet (23) and $Ra_1$ of the sheet (23) are shown on Table 2. Moreover, a surface free energy of the sheet (23) and a biofilm reduction rate of the sheet (23) calculated from A (molded body) and A (ABS) after a biofilm adhesion test with the microorganism A as an evaluation microorganism are shown on Table 18.

Comparative Example 4

The at least one resin (A) selected from the group consisting of thermoplastic resins and thermosetting resins was an acrylonitrile-butadiene-styrene copolymer (ABS, made by NIPPON A&L INC., Klarastic MTK), and the quorum sensing inhibitor (B) was ursolic acid (made by Sigma-Aldrich Co. LLC.). By using Labo Plastomill, 99 wt % of the acrylonitrile-butadiene-styrene copolymer, 1 wt % of ursolic acid were melted and kneaded at 200° C., thereby obtaining a resin composition.

The resin composition thus obtained by melting and kneading was placed into a frame for a spacer sized of 150 mm height×150 mm width×1 mm thickness, and the spacer was sandwiched between two aluminum places of 0.5 mm thickness, and further between two stainless steel plates of 2 mm thickness. A sample thus prepared was placed in a press molding machine in which press plates were set to 220° C., preheated for 5 min, pressed up to 10 MPa and held under the press for 5 min, and cooled at 30° C. for 5 min under 10 MPa, thereby preparing a sheet (24) of 1 mm in thickness.

log S of the quorum sensing inhibitor (B) contained in the sheet (24) and $Ra_1$ of the sheet (24) are shown on Table 2. Moreover, a surface free energy of the sheet (24) and a biofilm reduction rate of the sheet (24) calculated from A (molded body) and A (ABS) after a biofilm adhesion test with the microorganism A as an evaluation microorganism are shown on Table 19.

Comparative Example 5

A composition and a sheet (25) were prepared as in Example 14, except that the quorum sensing inhibitor (B) was flavone (made by Tokyo Chemical Industry Co., Ltd.).

log S of the quorum sensing inhibitor (B) contained in the sheet (25) and $Ra_1$ of the sheet (25) are shown on Table 2. Moreover, a surface free energy of the sheet (25) and a biofilm reduction rate of the sheet (25) calculated from A (molded body) and A (ABS) after a biofilm adhesion test with the microorganism A as an evaluation microorganism are shown on Table 19.

Comparative Example 6

A sheet (26) was prepared as in Example 1, except that, as the at least one resin (A) selected from the group consisting of thermoplastic resins and thermosetting resins, an olefin-based thermoplastic elastomer (TPE, made by Sumitomo Chemical Co., Ltd., ESPOLEX 4272) was used, and as an antimicrobial/antifungal agent (C), Bactekiller BM-102TG (silver-based antimicrobial agent, Fuji Chemical Industries, Ltd.) was used, and by using Labo Plastomill (made by Toyo Seiki Seisaku-sho, Ltd., R100), 99.5 wt % of TPE, and 0.5 wt % of Bactekiller BM-102TG were melted and kneaded at 200° C., thereby obtaining a resin composition.

A surface free energy of the sheet (26) and a biofilm reduction rate of the sheet (26) calculated from A (molded body) and A (TPE) after a biofilm adhesion test with the microorganism A as an evaluation microorganism are shown on Table 19.

TABLE 1

| | Name | LogS calculation method | LogS | Hansen Solubility Parameter Distance $Ra_1$ (Resin: TPE) Unit: $MPa^{1/2}$ |
|---|---|---|---|---|
| Quorum sensing inhibitor (B) | Curcumin | Method A | −3.8 | 15.8 |
| | 2,3,4-trimethoxycinnamate | Method A | −1.5 | 14.2 |
| | Eugenol | Method A | −0.8 | 11.8 |
| | 2-fluorocinnamate | Method A | −0.1 | 13.6 |
| | Flavone | Method A | −4.4 | 10.1 |
| | Tyrosol | Method A | 0.1 | 19.5 |
| | 3-Fluoro-4-methylphenylboronic acid | Method A | −9.6 | 25.4 |
| | Salicylic acid | Method A | −0.4 | 18.4 |
| | Thymol | Method A | −0.94 | 8.7 |
| | Phytol | Method A | −4.2 | 5.5 |
| | Umbelliferone | Method A | −0.8 | 16.7 |
| | (−)-epicatechin | Method A | −3.6 | 13.4 |
| | Carvacrol | Method A | −0.9 | 8.3 |
| | Tannic acid | Method A | −1.4 | 14.3 |
| | Indole | Method A | −0.5 | 13.4 |
| | Resveratrol | Method A | −1.4 | 16.7 |
| | Diphenyl disulfide | Method A | −3.2 | 8.8 |
| | N-(3-oxododecanoyl)-L-homoserine lactone | Method A | −3.1 | 13.8 |

TABLE 2

| Name | | LogS calculation method | LogS | Hansen Solubility Parameter Distance $Ra_1$ (Resin: ABS) Unit: $MPa^{1/2}$ |
|---|---|---|---|---|
| Quorum sensing inhibitor (B) | Purpurin | Method A | −2.3 | 12.2 |
| | Reserpine | Method A | −2.7 | 4.2 |
| | Curcumin | Method A | −3.8 | 8.4 |
| | Tyrosol | Method A | 0.1 | 13.1 |
| | Thymol | Method A | −0.94 | 3.2 |
| | Flavone | Method A | −4.4 | 2.7 |
| | Ursolic acid | Method A | −5.1 | 1.9 |

TABLE 3

| | Name | Example 1 | Example 2 | Example 3 | Example 4 | Example 5 |
|---|---|---|---|---|---|---|
| Resin (A) (wt %) | TPE | 97 | 97 | 97 | 97 | 97 |
| Quorum sensing Inhibitor (B) (wt %) | Curcumin | 3 | — | — | — | — |
| | 2,3,4-trimethoxycinnamate | — | 3 | — | — | — |
| | Eugenol | — | — | 3 | — | — |
| | 2-fluorocinnamate | — | — | — | 3 | — |
| | Flavone | — | — | — | — | 3 |
| $\gamma^d$ mN/m | | 27.3 | 27.1 | 27.3 | 27.1 | 26.8 |
| $\gamma^p + \gamma^h$ mN/m | | 6.3 | 7.6 | 6.5 | 6.8 | 11.5 |
| Evaluation microorganism | | Microorganism A | Microorganism A | Microorganism A | Microorganism A | Microorganism A |
| Biofilm reduction rate % | | 76 | 56 | 85 | 42 | 95 |

TABLE 4

| | Name | Example 6 | Example 7 | Example 8 | Example 9 |
|---|---|---|---|---|---|
| Resin (A) (wt %) | TPE | 97 | 97 | 97 | 97 |
| Quorum Sensing Inhibitor (B) (wt %) | 3-Fluoro-4-methylphenylboronic acid | 3 | — | — | — |
| | Salicylic acid | — | 3 | — | — |
| | Thymol | — | — | 3 | — |
| | Phytol | — | — | — | 3 |
| $Y^d$ mN/m | | 27.3 | 27.2 | 27.4 | 27.3 |
| $Y^p + Y^h$ mN/m | | 6.0 | 9.3 | 6.8 | 6.3 |
| Evaluation microorganism | | Microorganism A | Microorganism A | Microorganism A | Microorganism A |
| Biofilm reduction rate % | | 68 | 89 | 93 | 32 |

TABLE 5

| | Name | Example 10 | Example 11 | Example 12 | Example 13 |
|---|---|---|---|---|---|
| Resin (A) (wt %) | TPE | 99.5 | 99 | 96.5 | 96 |
| | Copolymer obtained in Production Example 2 | — | — | 3 | 3 |
| Quorum Sensing Inhibitor (B) (wt %) | 2,3,4-trimethoxycinnamate | 0.5 | 0.5 | 0.5 | 0.5 |
| Antimicrobial/antifungal agent (C) (wt %) | Thiabendazole | — | 0.5 | — | 0.5 |
| $Y^d$ mN/m | | 27.1 | 27.2 | 15.1 | 15.4 |
| $Y^p + Y^h$ mN/m | | 7.3 | 6.6 | 0.51 | 1.46 |
| Evaluation microorganism | | Microorganism A | Microorganism A | Microorganism A | Microorganism A |
| Biofilm reduction rate % | | 38 | 64 | 47 | 89 |

TABLE 6

| | | Examples | | |
|---|---|---|---|---|
| | Name | Examples 14 | Examples 15 | Examples 16 |
| Resin (A) (wt %) | ABS | 97 | 97 | 97 |
| Quorum Sensing Inhibitor (B) (wt %) | Purpurin | 3 | — | — |
| | Reserpine | — | 3 | — |
| | Curcumin | — | — | 3 |
| $Y^d$ mN/m | | 25.4 | 25.9 | 25.2 |
| $Y^p + Y^h$ mN/m | | 18.1 | 19.8 | 18.8 |
| Evaluation microorganism | | Microorganism A | Microorganism A | Microorganism A |
| Biofilm reduction rate % | | 61 | 64 | 61 |

TABLE 7

| | | Examples | | |
|---|---|---|---|---|
| | Name | Example 17 | Example 18 | Example 19 |
| Resin (A) (wt %) | ABS | 94 | 92 | 89 |
| | Copolymer obtained in Production Example 2 | — | 5 | 5 |
| Quorum Sensing Inhibitor (B) (wt %) | Purpurin | 3 | 3 | 3 |
| Antimicrobial/ antifungal agent (C) (wt %) | Thiabendazole | 3 | — | 3 |
| $Y^d$ mN/m | | 25.5 | 15.0 | 15.1 |
| $Y^p + Y^h$ mN/m | | 18.4 | 0.54 | 1.0 |
| Evaluation microorganism | | Microorganism A | Microorganism A | Microorganism A |
| Biofilm reduction rate % | | 80 | 75 | 85 |

TABLE 8

| | | | | Hansen Solubility Parameter Distance $Ra_1$ Unit: $MPa^{1/2}$ | |
|---|---|---|---|---|---|
| | Name | LogS calculation method | LogS | Resin: PP | Rersin: m-PPE |
| Quorum sensing inhibitor (B) | Curcumin | Method A | −3.8 | 15.8 | — |
| | 2,3,4-trimethoxycinnamate | Method A | −1.5 | 14.2 | — |
| | Phytol | Method A | −4.2 | — | 7.5 |

TABLE 9

| | | | | Hansen Solubility Parameter Distance $Ra_1$ Unit: $MPa^{1/2}$ | |
|---|---|---|---|---|---|
| | Name | LogS calculation method | LogS | Resin: Cross-linked PMMA | Resin: Cross-linked polymer of MMA and 1H,1H,2H,2H-heptadecafluorodecyl acrylate |
| Quorum sensing inhibitor (B) | Berberine chloride hydrate | Method B | −3.0 | 7.3 | 7.7 |
| | 2-fluoro-4-(trifluoromethyl)phenylboronic acid | Method B | −3.0> | 14.7 | — |
| | Flavanone | Method A | −3.1 | 6.1 | — |
| | Indole | Method A | −0.5 | 7.0 | — |

TABLE 10

| Name | | LogS calculation method | LogS | Hansen Solubility Parameter Distance $Ra_1$ Unit: $MPa^{1/2}$ | |
|---|---|---|---|---|---|
| | | | | Resin: unsaturated polyester | Resin: polyurethane |
| Quorum sensing inhibitor (B) | Berberine chloride hydrate | Method B | −3.0> | 5.3 | — |
| | 3-Fluoro-4-methylphenylboronic acid | Method A | −9.6 | — | 14.5 |

TABLE 11

| | Name | Examples | | | | |
|---|---|---|---|---|---|---|
| | | Example 20 | Example 21 | Example 22 | Example 23 | Example 24 |
| Resin (A) (wt %) | TPE | 99 | 99 | 99 | 99 | 99 |
| Quorum Sensing Inhibitor (B) (wt %) | Umbelliferone | 1 | — | — | — | — |
| | (−)-epicatechin | — | 1 | — | — | — |
| | Carvacrol | — | — | 1 | — | — |
| | Tannic acid | — | — | — | 1 | — |
| | Indole | — | — | — | — | 1 |
| $\gamma^d$ mN/m | | 25.1 | 26.9 | 26.8 | 25.9 | 27.0 |
| $\gamma^p + \gamma^h$ mN/m | | 5.4 | 7.4 | 7.7 | 6.0 | 9.1 |
| Evaluation microorganism | | Microorganism A | Microorganism A | Microorganism A | Microorganism A | Microorganism A |
| Biofilm reduction rate % | | 48 | 41 | 19 | 30 | 81 |

TABLE 12

| | Name | Examples | |
|---|---|---|---|
| | | Example 25 | Example 26 |
| Resin (A) (wt %) | TPE | 99 | 99 |
| Quorum Sensing Inhibitor (B) (wt %) | Resveratrol | 1 | — |
| | Diphenyl disulfide | — | 1 |
| $\gamma^d$ mN/m | | 25.7 | 26.5 |
| $\gamma^p + \gamma^h$ mN/m | | 3.3 | 5.3 |
| Evaluation microorganism | | Microorganism A | Microorganism A |
| Biofilm reduction rate % | | 29 | 19 |

TABLE 13

| | Name | Examples | | | |
|---|---|---|---|---|---|
| | | Example 27 | Example 28 | Example 29 | Example 30 |
| Resin (A) (wt %) | TPE | 99 | — | — | — |
| | PP | — | 99.5 | 99.5 | — |
| | m-PPE | — | — | — | 99 |
| Quorum Sensing Inhibitor (B) (wt %) | N-(3-oxododecanoyl)-L-homoserine lactone | 1 | — | — | — |
| | Curcumin | — | 0.5 | — | — |
| | 2,3,4-trimethoxycinnamate | — | — | 0.5 | — |
| | Phytol | — | — | — | 1 |
| $\gamma^d$ mN/m | | 25.2 | 25.9 | 26.2 | 19.3 |
| $\gamma^p + \gamma^h$ mN/m | | 4.3 | 4.4 | 4.9 | 4.1 |
| Evaluation microorganism | | Microorganism A | Microorganism A | Microorganism A | Microorganism A |
| Biofilm reduction rate % | | 49 | 29 | 17 | 58 |

TABLE 14

| | | Examples | | | |
|---|---|---|---|---|---|
| | Name | Example 31 | Example 32 | Example 33 | Example 34 |
| Resin (A) (wt %) | TPE | 99 | 99 | 99 | 99 |
| Quorum Sensing | Umbelliferone | 1 | — | — | — |
| Inhibitor (B) | Phytol | — | 1 | — | — |
| (wt %) | Carvacrol | — | — | 1 | — |
| | Tannic acid | — | — | — | 1 |
| $Y^d$ mN/m | | 25.1 | 27.3 | 26.8 | 25.9 |
| $Y^p + Y^h$ mN/m | | 5.4 | 6.2 | 7.7 | 6.0 |
| Evaluation microorganism | | Microorganism B | Microorganism B | Microorganism B | Microorganism B |
| Biofilm reduction rate % | | 61 | 26 | 77 | 48 |

TABLE 15

| | | Examples | | |
|---|---|---|---|---|
| | Name | Example 35 | Example 36 | Example 37 |
| Resin (A) (wt %) | TPE | 99 | 96.5 | 96 |
| | Copolymer obtained in Production Example 2 | — | 3 | 3 |
| Quorum Sensing Inhibitor (B) (wt %) | Phytol | 0.5 | 0.5 | 0.5 |
| Antimicrobial/antifungal agent (C) (wt %) | FK-C | 0.5 | — | 0.5 |
| $Y^d$ mN/m | | 26.3 | 9.5 | 9.2 |
| $Y^p + Y^h$ mN/m | | 0.1 | 0.8 | 1.1 |
| Evaluation microorganism | | Microorganism B | Microorganism B | Microorganism B |
| Biofilm reduction rate % | | 66 | 37 | 90 |

TABLE 16

| | | Examples | | | |
|---|---|---|---|---|---|
| | Name | Example 38 | Example 39 | Example 40 | Example 41 |
| Resin (A) (wt %) | MMA | 94 | 91 | 84 | 81 |
| | 1G | 1 | 1 | 1 | 1 |
| | 1H,1H,2H,2H-Heptadecafluorodecyl Acrylate | — | — | 10 | 10 |
| Quorum Sensing inhibitor (B) (wt %) | Berberine chloride hydrate | 5 | 5 | 5 | 5 |
| Antimicrobial/antifungal agent (C) (wt %) | OIT | — | 3 | — | 3 |
| $Y^d$ mN/m | | 26.9 | 27.4 | 14.0 | 9.5 |
| $Y^p + Y^h$ mN/m | | 33 | 27.3 | 5.1 | 10.4 |
| Evaluation microorganism | | Microorganism A | Microorganism. A | Microorganism A | Microorganism A |
| Biofilm reduction rate % | | 35 | 52 | 76 | 81 |

TABLE 17

| | | Examples | | | | |
|---|---|---|---|---|---|---|
| | Name | Example 42 | Example 43 | Example 44 | Example 45 | Example 46 |
| Resin (A) (wt %) | Unsaturated polyester | 95 | — | — | — | — |
| | Polyurethane | — | 95 | — | — | — |
| | MMA | — | — | 94 | 94 | 94 |
| | 1G | — | — | 1 | 1 | 1 |

TABLE 17-continued

|  | Name | Example 42 | Example 43 | Example 44 | Example 45 | Example 46 |
|---|---|---|---|---|---|---|
| Quorum Sensing Inhibitor (B) (wt %) | Berberine chloride | 5 | — | — | — | — |
|  | 2-fluoro-4-(trifluoromethyl)phenylboronic acid | — | — | 5 | — | — |
|  | Indole | — | — | — | 5 | — |
|  | Flavanone | — | — | — | — | 5 |
|  | 3-Fluoro-4-methylphenylboronic acid | — | 5 | — | — | — |
| $Y^d$ mN/m |  | 20.2 | 26.7 | 27.4 | 27.4 | 27.4 |
| $Y^p + Y^h$ mN/m |  | 16.4 | 18.4 | 41 | 51 | 53 |
| Evaluation microorganism |  | Microorganism A | Microorganism A | Microorganism A | Microorganism A | Microorganism A |
| Biofilm reduction rate % |  | 83 | 81 | 34 | 19 | 22 |

TABLE 18

|  |  | Comparative Examples | | |
|---|---|---|---|---|
|  | Name | Comparative Example 1 | Comparative Example 2 | Comparative Example 3 |
| Resin (A) (wt %) | TPE | 97 | — | — |
|  | ABS | — | 97 | 97 |
| Quorum Sensing Inhibitor (B) (wt %) | Tyrosol | 3 | 3 | — |
|  | Thymol | — | — | 3 |
| $Y^d$ mN/m |  | 27.1 | 25.8 | 25.4 |
| $Y^p + Y^h$ mN/m |  | 7.5 | 18.9 | 19.2 |
| Evaluation microorganism |  | Microorganism A | Microorganism A | Microorganism A |
| Biofilm reduction rate % |  | −2 | 6 | 3 |

TABLE 19

|  |  | Comparative Examples | | |
|---|---|---|---|---|
|  | Name | Comparative Example 4 | Comparative Example 5 | Comparative Example 6 |
| Resin (A) (wt %) | TPE | — | — | 99.5 |
|  | ABS | 99 | 97 | — |
| Quorum Sensing Inhibitor (B) (wt %) | Ursolic acid | 1 | — | — |
|  | Flavone | — | 3 | — |
| Antimicrobial/antifungal agent (C) (wt %) | Bactekiller BM102-TG | — | — | 0.5 |
| $Y^d$ mN/m |  | 25.5 | 25.5 | 27.2 |
| $Y^p + Y^h$ mN/m |  | 19.1 | 18.8 | 4.1 |
| Evaluation microorganism |  | Microorganism A | Microorganism A | Microorganism A |
| Biofilm reduction rate % |  | −10 | 2 | −12 |

INDUSTRIAL APPLICABILITY

According to the present invention, it is possible to provide a composition capable of reducing such adhesion of biofilms and therefore useful for producing a molded body, and a molded body including the composition.

The invention claimed is:

1. A composition comprising: at least one resin (A) selected from the group consisting of thermoplastic resins; and a quorum sensing inhibitor (B),
   wherein a common logarithm log S of solubility of the quorum sensing inhibitor (B) in water of 25° C. is less than 0.1, and
   $Ra_1$ is greater than 3.2 MPa$^{1/2}$, provided that $Ra_1$ is a distance between a Hansen solubility parameter of the at least one resin (A) selected from the group consisting of thermoplastic resins and a Hansen solubility parameter of the quorum sensing inhibitor (B); and
   wherein the at least one resin (A) includes a structural unit (A) derived from ethylene, and a structural unit (B) represented by the following formula (1), and
   optionally includes at least one structural unit (C) selected from the group consisting of a structural unit represented by the following formula (2),

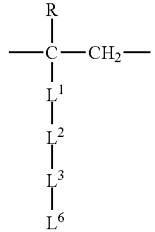

Formula (1)

where
R is a hydrogen atom or a methyl group,
$L^1$ is —CO—O—,
$L^2$ is a single bond,
$L^3$ is a single bond,
$L^6$ is —(CH$_2$)$_n$—R',
$R^1$ is a C$_1$ to C$_{15}$ alkyl group in which one or more hydrogen atoms are substituted with one or more fluorine atoms,
n is an integer not less than 0 but not more than 10,
each of the chemical formulae listed in $L^1$, $L^2$, and $L^3$ is such that the left side of the chemical formula corresponds to the upper side of Formula (1) and the right side of the chemical formula corresponds to the lower side of Formula (1),

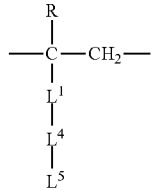

Formula (2)

where

R is a hydrogen atom or a methyl group, $L^1$ is —CO—O—, $L^4$ is a $C_1$ to $C_8$ alkylene group, $L^5$ is a hydrogen atom, each of the chemical formulae listed in $L^1$ is such that the left side of the chemical formula corresponds to the upper side of Formula (2) and the right side of the chemical formula corresponds to the lower side of Formula (2).

2. The composition according to claim 1, further comprising an antimicrobial/antifungal agent (C).

3. The composition according to claim 1, further comprising a surface modifier (D).

4. A molded body comprising the composition according to claim 1.

5. The molded body according to claim 4, wherein a dispersion force component $\gamma^d$ of a surface free energy is 25 mN/m or less, or a sum of a dipole force component $\gamma^p$ and a hydrogen bonding component $\gamma^h$ of the surface free energy is 30 mN/m or more.

* * * * *